(12) United States Patent
Kawamura et al.

(10) Patent No.: US 10,113,054 B2
(45) Date of Patent: Oct. 30, 2018

(54) MOLDED ARTICLE COMPRISING POLYAMIDE RESIN COMPOSITION

(71) Applicant: ASAHI KASEI CHEMICALS CORPORATION, Tokyo (JP)

(72) Inventors: Tomoyo Kawamura, Tokyo (JP); Masashi Okamoto, Tokyo (JP); Yasukazu Shikano, Tokyo (JP); Katsushi Watanabe, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 492 days.

(21) Appl. No.: 14/994,683

(22) Filed: Jan. 13, 2016

(65) Prior Publication Data

US 2016/0215109 A1 Jul. 28, 2016

(30) Foreign Application Priority Data

Jan. 22, 2015 (JP) .................. 2015-010176

(51) Int. Cl.
| | | |
|---|---|---|
| C08K 5/17 | (2006.01) | |
| C08K 3/22 | (2006.01) | |
| C08K 3/26 | (2006.01) | |
| C08K 3/24 | (2006.01) | |
| C08K 5/098 | (2006.01) | |
| C08K 7/14 | (2006.01) | |

(52) U.S. Cl.
CPC .............. C08K 5/175 (2013.01); C08K 3/22 (2013.01); C08K 3/24 (2013.01); C08K 3/26 (2013.01); C08K 5/098 (2013.01); C08K 7/14 (2013.01); C08K 2003/2227 (2013.01); C08K 2003/262 (2013.01)

(58) Field of Classification Search
None
See application file for complete search history.

(56) References Cited

U.S. PATENT DOCUMENTS

| | | | |
|---|---|---|---|
| 4,111,869 A * | 9/1978 | Puffr ................. | C08G 69/16 528/312 |
| 5,929,200 A | 7/1999 | Pagilagan et al. | |
| 9,657,159 B2 * | 5/2017 | Yamamoto .......... | B32B 1/02 |
| 2006/0155034 A1 | 7/2006 | Gijsman et al. | |
| 2007/0066767 A1 * | 3/2007 | Itayama ............. | C04B 24/32 525/453 |
| 2009/0069471 A1 | 3/2009 | Terada et al. | |
| 2010/0018025 A1 * | 1/2010 | Naritomi .......... | B29C 45/14778 29/458 |
| 2011/0028628 A1 | 2/2011 | Martens et al. | |
| 2011/0224347 A1 * | 9/2011 | Prusty ............... | C08G 73/0644 524/413 |
| 2013/0062806 A1 * | 3/2013 | Mitadera ............ | C08J 5/24 264/129 |
| 2013/0245171 A1 * | 9/2013 | Yao ................. | C08G 63/668 524/141 |
| 2014/0275385 A1 | 9/2014 | Gijsman et al. | |
| 2014/0288224 A1 | 9/2014 | Gijsman et al. | |
| 2015/0218348 A1 * | 8/2015 | Tsunaka ............ | C08G 69/265 524/607 |
| 2015/0274935 A1 * | 10/2015 | Hewel .............. | B65D 85/8043 428/36.4 |
| 2016/0089861 A1 * | 3/2016 | Wang ............... | H01M 2/0292 429/176 |
| 2016/0120750 A1 * | 5/2016 | Iwasaki ............ | A61J 1/10 604/410 |
| 2016/0254081 A1 * | 9/2016 | Aizawa ............. | H01C 1/034 524/436 |
| 2016/0264778 A1 * | 9/2016 | Masunaga ........... | C08L 77/02 |
| 2017/0009050 A1 * | 1/2017 | Kawamura .......... | C08K 5/175 |

FOREIGN PATENT DOCUMENTS

| | | | |
|---|---|---|---|
| CA | 2788267 | A | 9/2011 |
| CN | 101107320 | A | 1/2008 |
| CN | 101163746 | A | 4/2008 |
| JP | S49-116151 | A | 11/1974 |
| JP | H09-512839 | A | 12/1997 |
| JP | 2004-091778 | A | 3/2004 |
| JP | 2004091778 | A * | 3/2004 |
| JP | 2005-206662 | A | 8/2005 |
| JP | 2005-281616 | A | 10/2005 |
| JP | 2006225593 | A * | 8/2006 |
| JP | 2006-316244 | A | 11/2006 |
| JP | 2006-528260 | A | 12/2006 |
| JP | 2007-246647 | A | 9/2007 |
| JP | 2008-007563 | A | 1/2008 |
| JP | 2008-527127 | A | 7/2008 |
| JP | 2008-527129 | A | 7/2008 |
| JP | 2013-501095 | A | 1/2013 |
| JP | 2013-521393 | A | 6/2013 |
| WO | 2006/074934 | A1 | 7/2006 |
| WO | 2015-046247 | A1 | 4/2015 |
| WO | 2015-125886 | A1 | 8/2015 |

OTHER PUBLICATIONS

Machine Translation of JP 2006-225593 A. (Year: 2006).*

* cited by examiner

*Primary Examiner* — Kevin M Bernatz
(74) *Attorney, Agent, or Firm* — Greenblum & Bernstein, P.L.C.

(57) ABSTRACT

The present invention provides a molded article comprising a polyamide resin composition, wherein (the average concentration of alkali metal and/or alkaline earth metal elements in a region within a depth of 3 μm from the surface of the molded article)/(the average concentration of alkali metal and/or alkaline earth metal elements in a region except for the region within a depth of 3 μm from the surface of the molded article)>2.

18 Claims, No Drawings

MOLDED ARTICLE COMPRISING POLYAMIDE RESIN COMPOSITION

BACKGROUND

Field

The present invention relates to a molded article comprising a polyamide resin composition.

Description of the Related Art

Polyamide resins are excellent in strength, heat resistance, and chemical resistance and have a smaller specific gravity than that of metals. Therefore, the polyamide resins have heretofore been used as alternative materials for metals in automobile mechanical parts, etc.

In recent years, the downsizing of automobiles has been practiced as one approach for improvement in fuel efficiency. As a result, automobile engine room parts tend to have a higher density, and engine rooms tend to have a higher internal ambient temperature. In addition, higher powers have been imparted to engines with superchargers for improvement in fuel efficiency. Along with this, engine rooms tend to have an increasingly higher ambient temperature.

Thus, there has been a demand for molded articles having excellent mechanical physical properties under higher-temperature conditions than ever. Specifically, there has been a growing demand for molded articles that can maintain practically sufficient mechanical characteristics even when used for a long time under high-temperature conditions of 150° C. to 230° C.

A technique which involves adding a copper compound (an oxide or a salt of copper) is heretofore known as a technique for improving the heat aging resistance of polyamide resins.

Likewise, a technique which involves mixing a copper compound and iron oxide with 2 types of polyamide resins differing in melting point (see e.g., Patent Literature 3), a technique which involves mixing a fine element iron with a polyamide resin (see e.g., Patent Literature 4), and a technique which involves mixing a fine dispersed metal powder with a polyamide resin (see e.g., Patent Literature 5) are reported as techniques for improving the heat aging resistance.

Meanwhile, a polyamide resin composition supplemented with sodium aluminate and a method for producing the same are reported (see e.g., Patent Literatures 6 to 11). The polyamide resin composition supplemented with the sodium aluminate has been known to have excellent heat retention stability.

The "heat retention stability" refers to characteristics by which the polyamide resin is less decomposed and deteriorated when the polyamide resin composition is kept at a temperature equal to or higher than the melting point and is thereby in a melted state, and consequently, reduction in mechanical physical properties or color change of the polyamide resin composition caused by keeping it at the temperature equal to or higher than the melting point is prevented.

Also, a technique which involves supplementing a polyamide resin with a resin having a lower melting point than that of the polyamide resin and a heat stabilizer is reported (see e.g., Patent Literature 3).

A technique which involves mixing a phosphorus compound together with a polyvalent metal compound into a melted polyamide or mixing these compounds in a polyamide production and polymerization step to obtain a polyamide having improved color characteristics has been further reported (see e.g., Patent Literature 12).

CITATION LIST

Patent Literature

Patent Literature 1: National Publication of International Patent Application No. 2013-501095
Patent Literature 2: National Publication of International Patent Application No. 2013-521393
Patent Literature 3: National Publication of International Patent Application No. 2008-527129
Patent Literature 4: National Publication of International Patent Application No. 2006-528260
Patent Literature 5: National Publication of International Patent Application No. 2008-527127
Patent Literature 6: Japanese Patent Laid-Open No. 2005-206662
Patent Literature 7: Japanese Patent Laid-Open No. 2004-91778
Patent Literature 8: Japanese Patent Laid-Open No. 49-116151
Patent Literature 9: Japanese Patent Laid-Open No. 2008-7563
Patent Literature 10: Japanese Patent Laid-Open No. 2006-316244
Patent Literature 11: Japanese Patent Laid-Open No. 2005-281616
Patent Literature 12: National Publication of International Patent Application No. 9-512839

Use of the techniques disclosed in Patent Literatures 1 to 12, however, has failed to yield a polyamide resin composition having a high level of heat aging resistance. Thus, there has been a demand for molded articles having practically sufficient high-temperature mechanical characteristics even when used for a long time under high-temperature conditions as mentioned above.

Thus, an object of the present invention is to provide, in light of the aforementioned problems of the conventional techniques, a molded article comprising a polyamide resin composition having practically sufficient high-temperature mechanical characteristics even when used for a long time under high-temperature conditions.

SUMMARY

The present inventors have conducted diligent studies to attain the object and consequently completed the present invention by finding that the object is achieved by adjusting, in a molded article comprising a polyamide resin composition, the ration of the average concentration of alkali metal and/or alkaline earth metal elements in a region within a predetermined depth from the surface of the molded article to the average concentration of alkali metal and/or alkaline earth metal elements in a region except for the region within a predetermined depth from the surface of the molded article so that it falls within particular ranges.

Specifically, the present invention is as follows:

[1] A molded article comprising a polyamide resin composition, wherein (the average concentration of alkali metal and/or alkaline earth metal elements in a region within a depth of 3 μm from the surface of the molded article)/(the average concentration of alkali metal and/or alkaline earth metal elements in a region except for the region within a depth of 3 μm from the surface of the molded article)>2.

[2] The molded article according to [1], wherein the molded article contains a lower carboxylate of an alkali metal and/or an alkaline earth metal in a region within a depth of 1 μm from the surface of the molded article.

[3] The molded article according to [1] or [2], wherein the molded article contains a carbonate of an alkali metal and/or an alkaline earth metal in a region within a depth of 10 μm from the surface of the molded article.

[4] The molded article according to any of [1] to [3], wherein the molded article
comprises a metal aluminate, and
has one or more peaks each in ranges of 0 to 30 ppm, 30 to 60 ppm, and 70 to 100 ppm in solid-state 27Al-NMR measurement.

[5] The molded article according to any of [1] to [4], wherein the molded article has Mw of 50000 or higher and Mw/Mn of 3 or higher.

[6] The molded article according to any of [1] to [5], wherein the soluble content in hexafluoroisopropanol (HFIP) of a polyamide resin portion contained in the polyamide resin composition is 50% by mass or less of the polyamide resin portion contained in the polyamide resin composition.

[7] A molded article comprising a polyamide resin composition, wherein the molded article satisfies the following expression:

$$\alpha/\beta > 2, \text{ wherein}$$

α represents the average concentration of alkali metal and/or alkaline earth metal elements in a region within a depth of 3 μm from the surface of the molded article after heat aging treatment at 230° C. for 300 hours or longer, and
β represents the average concentration of alkali metal and/or alkaline earth metal elements in a region except for the region within a depth of 3 μm from the surface of the molded article after heat aging treatment at 230° C. for 300 hours or longer.

[8] The molded article according to [7], wherein the molded article contains a lower carboxylate of an alkali metal and/or an alkaline earth metal in a region within a depth of 1 μm from the surface of the molded article after heat aging treatment at 230° C. for 300 hours or longer.

[9] The molded article according to [7] or [8], wherein the molded article contains a carbonate of an alkali metal and/or an alkaline earth metal in a region within a depth of 10 nm from the surface of the molded article after heat aging treatment at 230° C. for 300 hours or longer.

[10] The molded article according to any of [7] to [9], wherein the molded article
comprises a metal aluminate, and
has one or more peaks each in ranges of 0 to 30 ppm, 30 to 60 ppm, and 70 to 100 ppm in solid-state 27Al-NMR measurement
after heat aging treatment at 230° C. for 300 hours or longer.

[11] The molded article according to any of [7] to [10], wherein the molded article has Mw of 50000 or higher and Mw/Mn of 3 or higher
after heat aging treatment at 230° C. for 300 hours or longer.

[12] The molded article according to any of [7] to [11], wherein the soluble content in hexafluoroisopropanol (HFIP) of a polyamide resin portion contained in the polyamide resin composition is 50% by mass or less of the polyamide resin portion contained in the polyamide resin composition
after heat aging treatment at 230° C. for 300 hours or longer.

[13] The molded article according to any of [1] to [12], wherein the molded article is an automobile part.

[14] The molded article according to any of [1] to [13], wherein the molded article is an automobile underhood part.

[15] The molded article according to any of [1] to [14], wherein the molded article is a hollow part.

The present invention provides a molded article comprising a polyamide resin composition having practically sufficient high-temperature mechanical characteristics even when used for a long time under high-temperature conditions

DETAILED DESCRIPTION

Hereinafter, a mode for carrying out the present invention (hereinafter, simply referred to as the "present embodiment") will be described in detail. The present embodiment described below is given merely for the purpose of illustrating the present invention. The present invention is not intended to be limited by the embodiments described below. The present invention can be appropriately changed or modified without departing from the spirit thereof.

[Molded Article Comprising Polyamide Resin Composition]

The molded article of the present embodiment is a molded article comprising a polyamide resin composition, wherein
(the average concentration of alkali metal and/or alkaline earth metal elements in a region within a depth of 3 μm from the surface of the molded article)/(the average concentration of alkali metal and/or alkaline earth metal elements in a region except for the region within a depth of 3 μm from the surface of the molded article)>2.

Hereinafter, the polyamide resin molded article according to the present embodiment will be described in detail.

(Method for Calculating (Average Concentration of Alkali Metal and/or Alkaline Earth Metal Elements in Region within Depth of 3 μm from Surface of Molded Article)/(Average Concentration of Alkali Metal and/or Alkaline Earth Metal Elements in Region Except for Region within Depth of 3 μm from Surface of Molded Article))

First, the method for measuring the average concentration of alkali metal and/or alkaline earth metal elements in the molded article will be described. The same method is used for measuring the average concentration of alkali metal and/or alkaline earth metal elements in a region within a depth of 3 μm from the surface of the molded article and the average concentration of alkali metal and/or alkaline earth metal elements in a region except for the region within a depth of 3 μm from the surface of the molded article.

For example, SEM (scanning electron microscopy)-EDX (energy dispersive X-ray spectroscopy) can be used as the method for measuring the average concentration of alkali metal and/or alkaline earth metal elements in the molded article, though the method according to the present invention is not limited thereto.

Specifically, the molded article comprising a polyamide resin composition according to the present embodiment is cut in a direction perpendicular to the surface. The cut surface is smoothed using a diamond knife to obtain a sample for measurement. The sample is mounted to a stage for SEM observation using a carbon tape, treated for conduction, and subjected to SEM-EDX measurement.

In the EDX measurement, the detected intensity of the alkali metal and/or alkaline earth metal elements in a region within a depth of 3 μm from the surface of the sample and the detected intensity of the alkali metal and/or alkaline earth metal elements in a region except for the region within a depth of 3 μm from the surface of the sample in the measured field of view are defined as the respective relative average concentrations of the elements in the regions.

The detected intensity of the alkali metal and/or alkaline earth metal elements is defined as the amount of the alkali metal and/or alkaline earth metal elements detected in a given area in the measured region for a given measurement time.

The value of "(the average concentration of alkali metal and/or alkaline earth metal elements in a region within a depth of 3 μm from the surface of the molded article)/(the average concentration of alkali metal and/or alkaline earth metal elements in a region except for the region within a depth of 3 μm from the surface of the molded article)" is calculated using the measurement values obtained by the aforementioned method.

Specifically, the alkali metal and/or alkaline earth metal concentration in the molded article can be measured by a method described in Examples mentioned later.

Hereinafter, exemplary measurement apparatuses and measurement conditions will be given. However, the measurement apparatuses are not limited to the apparatuses given below, and the measurement conditions can be appropriately set to conditions that permit proper measurement by use of the general knowledge of those skilled in the art.

1. SEM observation
   Apparatus: trade name S-2700 manufactured by Hitachi, Ltd.
2. EDX measurement
   Apparatus: trade name EMAX5770 manufactured by Horiba, Ltd.
   Acceleration voltage: 20 kV
   Sample current: $8 \times 10^{-10}$ A In the molded article comprising a polyamide resin composition according to the present embodiment, (the average concentration of alkali metal and/or alkaline earth metal elements in a region within a depth of 3 μm from the surface of the molded article)/(the average concentration of alkali metal and/or alkaline earth metal elements in a region except for the region within a depth of 3 μm from the surface of the molded article)>2.

The molded article that satisfies the aforementioned requirement effectively has practically sufficient high-temperature mechanical characteristics even when used for a long time under high-temperature conditions.

The value of (the average concentration of alkali metal and/or alkaline earth metal elements in a region within a depth of 3 μm from the surface of the molded article)/(the average concentration of alkali metal and/or alkaline earth metal elements in a region except for the region within a depth of 3 μm from the surface of the molded article) is preferably 3 or more, more preferably 4 or more, from the viewpoint that resulting molded article effectively has more favorable high-temperature mechanical characteristics even when used for a long time under high-temperature conditions. The upper limit is not particularly limited and is preferably 10000 or less from the viewpoint of maintaining favorable surface appearance.

The alkali metal and/or the alkaline earth metal is preferably an alkali metal, more preferably sodium and/or potassium, from the viewpoint that resulting molded article effectively has more favorable high-temperature mechanical characteristics even when used for a long time under high-temperature conditions.

The molded article of the present embodiment preferably contains a lower carboxylate of an alkali metal and/or an alkaline earth metal in a region within a depth of 1 μm from the surface of the molded article from the viewpoint of improving flexural modulus at high temperatures.

(Method for Measuring Lower Carboxylate of Alkali Metal and/or Alkaline Earth Metal Present in Region within Depth of 1 μm from Surface of Molded Article)

The method for measuring a lower carboxylate of an alkali metal and/or an alkaline earth metal present in a region within a depth of 1 μm from the surface of the molded article will be described. For example, ATR (attenuated total reflectance) or ion chromatography/mass spectrometry can be used as the measurement method, though the method according to the present invention is not limited thereto.

In the ATR, the penetration depth of light into a sample for measurement can be adjusted by changing the angle of incidence and the refractive index of a prism. The presence or absence of the lower carboxylate of an alkali metal and/or an alkaline earth metal in a region within a depth of 1 μm from the surface of the molded article is confirmed by use of ATR.

Alternatively, the region within a depth of 1 μm from the surface of the molded article is measured by ion chromatography/mass spectrometry to confirm the presence or absence of the lower carboxylate.

Specifically, the lower carboxylate of an alkali metal and/or an alkaline earth metal in the molded article can be measured by a method described in Examples mentioned later.

The lower carboxylic acid refers to a carboxylic acid having 1 or more and 10 or less carbon atoms. Examples thereof include, but are not limited to, formic acid, acetic acid, propionic acid, butyric acid, pentanoic acid, hexanoic acid, and adipic acid.

An alkali metal and/or alkaline earth metal salt of one type of lower carboxylic acid may be present alone as the lower carboxylate of an alkali metal and/or an alkaline earth metal, or a mixture of alkali metal and/or alkaline earth metal salts of a plurality of lower carboxylic acids may be present.

The alkali metal and/or the alkaline earth metal is preferably an alkali metal, more preferably sodium and/or potassium, from the viewpoint that the resulting molded article effectively has more favorable high-temperature mechanical characteristics even when used for a long time under high-temperature conditions.

The molded article of the present embodiment preferably contains a carbonate of an alkali metal and/or an alkaline earth metal in a region within a depth of 10 nm from the surface of the molded article from the viewpoint of improving tensile strength and flexural modulus at high temperatures.

(Method for Measuring Carbonate of Alkali Metal and/or Alkaline Earth Metal Present in Region within Depth of 10 nm from Surface of Molded Article)

The method for measuring a carbonate of an alkali metal and/or an alkaline earth metal present in a region within a depth of 10 nm from the surface of the molded article of the present embodiment will be described.

The measurement is carried out using, for example, X-ray photoelectron spectroscopy (XPS) to confirm the presence or absence of the carbonate of an alkali metal and/or an alkaline earth metal in a region within a depth of 10 nm from the surface of the molded article.

Specifically, the carbonate of an alkali metal and/or an alkaline earth metal in the molded article can be measured by a method described in Examples mentioned later.

The alkali metal and/or the alkaline earth metal is preferably an alkali metal, more preferably sodium and/or potassium, from the viewpoint that the resulting molded article effectively has more favorable high-temperature mechanical characteristics even when used for a long time under high-temperature conditions.

The molded article of the present embodiment preferably contains a metal aluminate and has one or more peaks each in ranges of 0 to 30 ppm, 30 to 60 ppm, and 70 to 100 ppm in solid-state 27Al-NMR measurement, from the viewpoint of further improving high-temperature mechanical physical properties.

(Solid-State 27Al-NMR Measurement)

The solid-state 27Al-NMR measurement can be carried out using, for example, a nuclear magnetic resonance apparatus (trade name: "ECA500", manufactured by JEOL Ltd.), though the apparatus according to the present invention is not limited thereto.

Measurement conditions involving, for example, the number of spins of 8 k/s, PD of 5 s, 4.152 ppm aluminum potassium sulfate as an external standard, BF of 20.0 Hz, and a temperature of room temperature, can be adopted, though the measurement conditions according to the present invention are not limited thereto.

Specifically, the solid-state 27Al-NMR evaluation of the molded article can be carried out by a method described in Examples mentioned later.

The molded article of the present embodiment has a weight-average molecular weight (Mw) of preferably 50000 or higher and weight-average molecular weight (Mw)/number-average molecular weight (Mn) of preferably 3 or higher, from the viewpoint of further improving high-temperature mechanical physical properties.

(Number-Average Molecular Weight (Mn) and Weight-Average Molecular Weight (Mw))

Mw and Mn of the molded article of the present embodiment can be measured by GPC (gel permeation chromatography). Mw/Mn can be calculated using these measurement values.

In the GPC, the molded article of the present embodiment is used as a sample for measurement, and, for example, hexafluoroisopropanol can be used as a solvent for measurement. A value based on PMMA is determined.

The number-average molecular weight (Mn) and the weight-average molecular weight (Mw) of the molded article are obtained as measurement values of a polyamide resin contained in the molded article.

In the molded article comprising a polyamide resin composition according to the present embodiment, the soluble content in hexafluoroisopropanol (HFIP) of a polyamide resin portion contained in the polyamide resin composition is preferably 50% by mass or less, more preferably 40% by mass or less, further preferably 30% by mass or less, of the polyamide resin portion contained in the polyamide resin composition from the viewpoint of further improving high-temperature mechanical physical properties.

(Method for Measuring Soluble Content in Hexafluoroisopropanol (HFIP) of Polyamide Resin Portion Contained in Polyamide Resin Composition)

The method for measuring the soluble content in hexafluoroisopropanol (HFIP) of a polyamide resin portion contained in the polyamide resin composition will be described.

First, the molded article comprising a polyamide resin composition according to the present embodiment is incinerated, and the content of the inorganic matter is determined from the mass of the residue. The incineration method is, for example, incineration by heating at 650° C. for 3 hours in a crucible, though the method according to the present invention is not limited thereto.

Next, the molded article comprising a polyamide resin composition is dissolved in hexafluoroisopropanol (HFIP). Although the method for measuring the soluble content is not limited to the method given below, for example, 1 g of the molded article comprising a polyamide resin composition is dipped in 50 mL of HFIP and left at room temperature for 24 hours. Then, a portion insoluble in HFIP is taken out and dried. For example, the insoluble portion is left at room temperature for 24 hours, then heated to 60° C. in nitrogen, and dried for 3 hours. Then, the mass is measured.

The soluble content in HFIP of the polyamide resin portion except for the inorganic matter can be determined from the results of measuring the content of the inorganic matter mentioned above and the masses before and after the dissolution in HFIP.

The molded article of the present embodiment also includes a molded article that satisfies the following expression:

$\alpha/\beta > 2$, wherein $\alpha$ represents the average concentration of alkali metal and/or alkaline earth metal elements in a region within a depth of 3 μm from the surface of the molded article after heat aging treatment at 230° C. for 300 hours or longer, and $\beta$ represents the average concentration of alkali metal and/or alkaline earth metal elements in a region except for the region within a depth of 3 μm from the surface of the molded article after heat aging treatment at 230° C. for 300 hours or longer.

Specifically, the molded article of the present embodiment includes a molded article that has not yet undergone the heat aging treatment and can satisfy the above expression after being subjected to the heat aging treatment.

The alkali metal and/or the alkaline earth metal is preferably an alkali metal, more preferably sodium and/or potassium, from the viewpoint that resulting molded article effectively has more favorable high-temperature mechanical characteristics even when used for a long time under high-temperature conditions.

The molded article of the present embodiment is preferably the molded article comprising a polyamide resin composition, wherein the molded article contains a lower carboxylate of an alkali metal and/or an alkaline earth metal in a region within a depth of 1 μm from the surface of the molded article after heat aging treatment at 230° C. for 300 hours or longer.

Specifically, the molded article of the present embodiment includes a molded article that has not yet undergone the heat aging treatment and satisfies the condition that the molded article contains a lower carboxylate of an alkali metal and/or an alkaline earth metal in a region within a depth of 1 μm from the surface of the molded article, after being subjected to the heat aging treatment.

The alkali metal and/or the alkaline earth metal is preferably an alkali metal, more preferably sodium and/or potassium, from the viewpoint that resulting molded article effectively has more favorable high-temperature mechanical characteristics even when used for a long time under high-temperature conditions.

The molded article of the present embodiment is preferably the molded article comprising a polyamide resin composition, wherein the molded article contains a carbonate of an alkali metal and/or an alkaline earth metal in a region within a depth of 10 nm from the surface of the molded article after heat aging treatment at 230° C. for 300 hours or longer.

Specifically, the molded article of the present embodiment includes a molded article that has not yet undergone the heat aging treatment and satisfies the condition that the molded article contains a carbonate of an alkali metal and/or an alkaline earth metal in a region within a depth of 10 nm from the surface of the molded article, after being subjected to the heat aging treatment.

The alkali metal and/or the alkaline earth metal is preferably an alkali metal, more preferably sodium and/or potassium, from the viewpoint that the resulting molded article effectively has more favorable high-temperature mechanical characteristics even when used for a long time under high-temperature conditions.

The molded article of the present embodiment is preferably the molded article comprising a polyamide resin composition, wherein the molded article contains a metal aluminate and has one or more peaks each in ranges of 0 to 30 ppm, 30 to 60 ppm, and 70 to 100 ppm in solid-state 27Al-NMR measurement after heat aging treatment at 230° C. for 300 hours or longer.

Specifically, the molded article of the present embodiment includes a molded article that has not yet undergone the heat aging treatment and satisfies the condition that the molded article contains a metal aluminate and has one or more peaks each in ranges of 0 to 30 ppm, 30 to 60 ppm, and 70 to 100 ppm in solid-state 27Al-NMR measurement, after being subjected to the heat aging treatment.

The molded article of the present embodiment is preferably the molded article comprising a polyamide resin composition, wherein the molded article has Mw of 50000 or higher and Mw/Mn of 3 or higher after heat aging treatment at 230° C. for 300 hours or longer.

Specifically, the molded article of the present embodiment includes a molded article that has not yet undergone the heat aging treatment and satisfies the condition that the molded article has Mw of 50000 or higher and Mw/Mn of 3 or higher, after being subjected to the heat aging treatment.

Mw and Mn can be measured by GPC and, specifically, can be measured by a method described in Examples mentioned later.

The molded article of the present embodiment is preferably the molded article comprising a polyamide resin composition, wherein the soluble content in hexafluoroisopropanol (HFIP) of a polyamide resin portion contained in the polyamide resin composition is 50% by mass or less of the polyamide resin portion contained in the polyamide resin composition after heat aging treatment at 230° C. for 300 hours or longer.

Specifically, the molded article of the present embodiment includes a molded article that has not yet undergone the heat aging treatment and satisfies the condition that the soluble content in hexafluoroisopropanol (HFIP) of a polyamide resin portion contained in the polyamide resin composition is 50% by mass or less of the polyamide resin portion contained in the polyamide resin composition, after being subjected to the heat aging treatment.

Hereinafter, each specific constituent of the molded article comprising a polyamide resin composition according to the present embodiment will be described in detail.

The method for producing the molded article comprising a polyamide resin composition according to the present embodiment is not particularly limited, and a method given below can be preferably used.

((A) Polyamide resin) The polyamide resin composition of the present embodiment contains (A) a polyamide resin (hereinafter, also referred to as a "component (A)").

The "polyamide resin" is a polymer having amide bonds (—NHCO—) in the backbone.

Examples of the polyamide resin (A) include, but are not limited to, a polyamide resin obtained by the condensation polymerization of a diamine and a dicarboxylic acid, a polyamide resin obtained by the ring-opening polymerization of a lactam, a polyamide resin obtained by the self-condensation of an aminocarboxylic acid, and a copolymer obtained by the copolymerization of two or more types of monomers constituting these polyamide resins.

Only one of these polyamide resins may be used alone as the polyamide resin (A), or two or more thereof may be used in combination.

Hereinafter, the starting materials for the polyamide resin will be described.

<Diamine>

Examples of the diamine include, but are not limited to, aliphatic diamines, alicyclic diamines, and aromatic diamines.

Examples of the aliphatic diamines include, but are not limited to: linear saturated aliphatic diamines each having 2 to 20 carbon atoms such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine; and branched saturated aliphatic diamines each having 3 to 20 carbon atoms such as 2-methylpentamethylenediamine (also referred to as 2-methyl-1,5-diaminopentane), 2,2,4-trimethylhexamethylenediamine, 2,4,4-trimethylhexamethylenediamine, 2-methyloctamethylenediamine, and 2,4-dimethyloctamethylenediamine. Examples of the branched saturated aliphatic diamines include diamines having a substituent branched from the backbone.

Examples of the alicyclic diamines include, but are not limited to, 1,4-cyclohexanediamine, 1,3-cyclohexanediamine, and 1,3-cyclopentanediamine.

Examples of the aromatic diamines include, but are not limited to, m-xylylenediamine, p-xylylenediamine, m-phenylenediamine, o-phenylenediamine, and p-phenylenediamine.

<Dicarboxylic Acid>

Examples of the dicarboxylic acid include, but are not limited to, aliphatic dicarboxylic acids, alicyclic dicarboxylic acids, and aromatic dicarboxylic acids.

Examples of the aliphatic dicarboxylic acids include, but are not limited to, linear or branched saturated aliphatic dicarboxylic acids each having 3 to 20 carbon atoms such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyladipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of the alicyclic dicarboxylic acids include, but are not limited to, alicyclic dicarboxylic acids such as 1,4-cyclohexanedicarboxylic acid, 1,3-cyclohexanedicarboxylic acid, and 1,3-cyclopentanedicarboxylic acid.

The number of carbon atoms in the alicyclic structure of each alicyclic dicarboxylic acid is not particularly limited and is preferably 3 to 10, more preferably 5 to 10, from the viewpoint of the balance between the water absorbability and the degree of crystallinity of the resulting polyamide resin.

The alicyclic dicarboxylic acid may be unsubstituted or may have a substituent.

Examples of the substituent include, but are not limited to, alkyl groups each having 1 to 4 carbon atoms such as a methyl group, an ethyl group, a n-propyl group, an isopropyl group, a n-butyl group, an isobutyl group, and a tert-butyl group.

Examples of the aromatic dicarboxylic acids include, but are not limited to, aromatic dicarboxylic acids each having 8 to 20 carbon atoms unsubstituted or substituted by a substituent.

Examples of the substituent include, but are not limited to, alkyl groups each having 1 to 6 carbon atoms, aryl groups each having 6 to 12 carbon atoms, arylalkyl groups each having 7 to 20 carbon atoms, halogen groups such as a chloro group and a bromo group, alkylsilyl groups each having 3 to 10 carbon atoms, sulfonic acid groups, and groups which are salts (e.g., sodium salt) thereof.

Examples of the aromatic dicarboxylic acids include, but are not limited to, terephthalic acid, isophthalic acid, naphthalenedicarboxylic acid, 2-chloroterephthalic acid, 2-methylterephthalic acid, 5-methylisophthalic acid, and 5-sodium sulfoisophthalic acid.

The dicarboxylic acids may further include trivalent or higher polyvalent carboxylic acids such as trimellitic acid, trimesic acid, and pyromellitic acid without impairing the object of the present invention.

Only one of these diamines or dicarboxylic acids may be used alone, or two or more thereof may be used in combination.

<Lactam>

Examples of the lactam include, but are not limited to, butyrolactam, pivalolactam, ε-caprolactam, caprylolactam, enantholactam, undecanolactam, and laurolactam (dodecanolactam).

Among them, ε-caprolactam, laurolactam, or the like is preferred, and ε-caprolactam is more preferred, from the viewpoint of tenacity.

<Aminocarboxylic Acid>

Examples of the aminocarboxylic acid include, but are not limited to, compounds obtained by the ring-opening of the aforementioned lactam (ω-aminocarboxylic acid, α,ω-aminocarboxylic acid, etc.).

The aminocarboxylic acid is preferably a linear or branched saturated aliphatic carboxylic acid having 4 to 14 carbon atoms substituted at the ω position by an amino group from the viewpoint of enhancing the degree of crystallinity. Examples of the aminocarboxylic acid include, but are not limited to, 6-aminocaproic acid, 11-aminoundecanoic acid, and 12-aminododecanoic acid. Another example of the aminocarboxylic acid includes p-aminomethylbenzoic acid.

Examples of the aforementioned polyamide resin (A) include, but are not limited to, polyamide resins such as polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 56 (polypentamethylene adipamide), polyamide 66 (polyhexamethylene adipamide), polyamide 610 (polyhexamethylene sebacamide), polyamide 612 (polyhexamethylene dodecamide), polyamide 116 (polyundecamethylene adipamide), polyamide TMHT (trimethylhexamethylene terephthalamide), polyamide 6T (polyhexamethylene terephthalamide), polyamide 2Me-5T (poly-2-methylpentamethylene terephthalamide), polyamide 9T (polynonamethylene terephthalamide), 2Me-8T (poly-2-methyloctamethylene terephthalamide), polyamide 6I (polyhexamethylene isophthalamide), polyamide 6C (polyhexamethylene cyclohexane dicarboxamide), polyamide 2Me-5C (poly-2-methylpentamethylene cyclohexane dicarboxamide), polyamide 9C (polynonamethylene cyclohexane dicarboxamide), 2Me-8C (poly-2-methyloctamethylene cyclohexane dicarboxamide), polyamide PACM12 (polybis(4-aminocyclohexyl)methane dodecamide), polyamide dimethyl PACM12 (polybis(3-methyl-aminocyclohexyl)methane dodecamide, polyamide MXD6 (poly-m-xylylene adipamide), polyamide 10T (polydecamethylene terephthalamide), polyamide 11T (polyundecamethylene terephthalamide), polyamide 12T (polydodecamethylene terephthalamide), polyamide 10C (polydecamethylene cyclohexane dicarboxamide), polyamide 11C (polyundecamethylene cyclohexane dicarboxamide), and polyamide 12C (polydodecamethylene cyclohexane dicarboxamide).

The symbol "Me" represents a methyl group.

The polyamide resin (A) is preferably polyamide 46 (polytetramethylene adipamide), polyamide 66 (polyhexamethylene adipamide), polyamide 610, polyamide 612, polyamide 6T (polyhexamethylene terephthalamide), polyamide 9T (polynonanemethylene terephthalamide), polyamide 6I (polyhexamethylene isophthalamide), or polyamide MXD6 (poly-m-xylylene adipamide), or copolymerized polyamide containing these polyamide resins as constituents.

The polyamide resin (A) is particularly preferably polyamide 66 from the viewpoint of further improving heat aging resistance.

The melting point of the polyamide resin (A) is not particularly limited and is preferably 200° C. or higher, more preferably 210° C. or higher, further preferably 240° C. or higher. The melting point of the polyamide resin (A) is set to a value equal to or higher than 200° C., whereby the molded article of the present embodiment tends to have improved heat resistance. The upper limit of the melting point of the polyamide resin (A) is not particularly limited and is preferably 340° C. or lower. The melting point of the polyamide resin (A) is set to a value equal to or lower than 340° C., whereby the thermal decomposition or degradation of the polyamide resin composition during melt processing tends to be able to be effectively suppressed.

The melting point of the polyamide resin (A) can be measured according to JIS-K7121. For example, trade name: Diamond DSC manufactured by PerkinElmer Inc. can be used as a measurement apparatus. Specifically, the melting point of the polyamide resin (A) can be measured by a method described in Examples mentioned later.

The content of the polyamide resin (A) in the polyamide resin composition is preferably 33% by mass or more and 95% by mass or less, more preferably 50% by mass or more and 75% by mass or less.

The polyamide resin composition of the present embodiment containing the polyamide resin (A) in the aforementioned range tends to be excellent in strength, heat resistance, chemical resistance, specific gravity, etc.

The relative viscosity in sulfuric acid of the polyamide resin (A) is preferably 1.8 or more and 3.0 or less, more preferably 2.2 or more and 2.8 or less. The relative viscosity in sulfuric acid is 1.8 or more, whereby the resulting polyamide resin composition tends to have better mechanical physical properties. Also, the relative viscosity in sulfuric acid is 3.0 or less, whereby the resulting polyamide resin composition tends to have better flowability and appearance.

The relative viscosity in sulfuric acid can be controlled by the adjustment of a polymerization pressure for the polyamide resin (A).

The relative viscosity in sulfuric acid can be measured by a method according to JIS K 6920. Specifically, the relative viscosity in sulfuric acid can be measured by a method described in Examples mentioned later.

An end-capping agent for molecular weight adjustment can be further added during the polymerization of the monomers of the polyamide resin (A). This end-capping agent is not particularly limited, and any of those known in the art can be used. Examples of the end-capping agent include, but are not limited to, monocarboxylic acids, monoamines, acid anhydrides such as phthalic anhydride, monoisocyanates, monoacid halides, monoesters, and monoalcohols. Among them, a monocarboxylic acid or a monoamine is preferred from the viewpoint of the heat stability of the polyamide resin (A).

Only one of these end-capping agents may be used alone, or two or more thereof may be used in combination.

The monocarboxylic acids that can be used as the end-capping agent can be any monocarboxylic acid having reactivity with an amino group. Examples thereof include, but are not limited to: aliphatic monocarboxylic acids such as formic acid, acetic acid, propionic acid, butyric acid, valeric acid, caproic acid, caprylic acid, lauric acid, tridecylic acid, myristic acid, palmitic acid, stearic acid, pivalic acid, and isobutyric acid; alicyclic monocarboxylic acids such as cyclohexanecarboxylic acid; and aromatic monocarboxylic acids such as benzoic acid, toluic acid, α-naphthalenecarboxylic acid, β-naphthalenecarboxylic acid, methylnaphthalenecarboxylic acid, and phenylacetic acid.

Only one of these monocarboxylic acids may be used alone, or two or more thereof may be used in combination.

The monoamines that can be used as the end-capping agent can be any monoamine having reactivity with a carboxyl group. Examples thereof include, but are not limited to: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine.

Only one of these monoamines may be used alone, or two or more thereof may be used in combination.

Examples of the acid anhydrides that can be used as the end-capping agent include, but are not limited to, phthalic anhydride, maleic anhydride, benzoic anhydride, acetic anhydride, and hexahydrophthalic anhydride.

Only one of these acid anhydrides may be used alone, or two or more thereof may be used in combination.

Examples of the monoisocyanates that can be used as the end-capping agent include, but are not limited to, phenyl isocyanate, tolyl isocyanate, dimethylphenyl isocyanate, cyclohexyl isocyanate, butyl isocyanate, and naphthyl isocyanate.

Only one of these monoisocyanates may be used alone, or two or more thereof may be used in combination.

Examples of the monoacid halides that can be used as the end-capping agent include, but are not limited to, halogen-substituted monocarboxylic acids of monocarboxylic acids such as benzoic acid, diphenylmethanecarboxylic acid, diphenylsulfonecarboxylic acid, diphenyl sulfoxide carboxylic acid, diphenyl sulfide carboxylic acid, diphenyl ether carboxylic acid, benzophenonecarboxylic acid, biphenylcarboxylic acid, α-naphthalenecarboxylic acid, β-naphthalenecarboxylic acid, and anthracenecarboxylic acid.

Only one of these monoacid halides may be used alone, or two or more thereof may be used in combination.

Examples of the monoesters that can be used as the end-capping agent include, but are not limited to, glycerin monopalmitate, glycerin monostearate, glycerin monobehenate, glycerin monomontanate, pentaerythritol monopalmitate, pentaerythritol monostearate, pentaerythritol monobehenate, pentaerythritol monomontanate, sorbitan monopalmitate, sorbitan monostearate, sorbitan monobehenate, sorbitan monomontanate, sorbitan dimontanate, sorbitan trimontanate, sorbitol monopalmitate, sorbitol monostearate, sorbitol monobehenate, sorbitol tribehenate, sorbitol monomontanate, and sorbitol dimontanate.

Only one of these monoesters may be used alone, or two or more thereof may be used in combination.

Examples of the monoalcohols that can be used as the end-capping agent include, but are not limited to, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, docosanol, tricosanol, tetracosanol, hexacosanol, heptacosanol, octacosanol, and triacontanol (all of which include linear and branched alcohols), oleyl alcohol, behenyl alcohol, phenol, cresol (o-, m-, and p-forms), biphenol (o-, m-, and p-forms), 1-naphthol, and 2-naphthol.

Only one of these monoalcohols may be used alone, or two or more thereof may be used in combination.

((B) Alkali Metal and/or Alkaline Earth Metal Compound)

In the molded article comprising a polyamide resin composition according to the present embodiment, the polyamide resin composition contains (B) an alkali metal and/or alkaline earth metal compound (hereinafter, also referred to as a "component (B)").

Examples of the alkali metal and/or alkaline earth metal compound (B) include, but are not limited to, alkali metal and/or alkaline earth metal salts of aluminic acid, alkali metal and/or alkaline earth metal carbonates, alkali metal bicarbonates, alkali metal and/or alkaline earth metal hydroxides, and alkali metal and/or alkaline earth metal carboxylates.

Examples of the alkali metal and/or alkali earth metal salts of aluminic acid include, but are not limited to, lithium aluminate, sodium aluminate, potassium aluminate, beryllium aluminate, magnesium aluminate, and calcium aluminate.

Only one of these alkali metal and/or alkali earth metal salts of aluminic acid may be used alone, or two or more thereof may be used in combination.

The alkali metal and/or alkali earth metal salts of aluminic acid is preferably an aluminic acid alkali metal salt, more preferably sodium aluminate, from the viewpoint of improving heat aging resistance.

Examples of the alkali metal and/or alkaline earth metal carbonates include, but are not limited to, sodium carbonate, potassium carbonate, magnesium carbonate, and calcium carbonate.

Only one of these alkali metal and/or alkaline earth metal carbonates may be used alone, or two or more thereof may be used in combination.

Examples of the alkali metal bicarbonates include, but are not limited to, sodium bicarbonate and potassium bicarbonate.

Only one of these alkali metal bicarbonates may be used alone, or two or more thereof may be used in combination.

Examples of the alkali metal and/or alkaline earth metal hydroxides include, but are not limited to, sodium hydroxide, magnesium hydroxide, potassium hydroxide, and calcium hydroxide.

Only one of these alkali metal and/or alkaline earth metal hydroxides may be used alone, or two or more thereof may be used in combination.

Examples of the alkali metal and/or alkaline earth metal carboxylates include, but are not limited to, tetrasodium ethylenediaminetetraacetate, disodium ethylenediaminetetraacetate, monosodium citrate, trisodium citrate, sodium isophthalate, and sodium adipate.

Only one of these alkali metal and/or alkaline earth metal carboxylates may be used alone, or two or more thereof may be used in combination.

In the polyamide resin composition contained in the molded article of the present embodiment, the content of the alkali metal and/or alkaline earth metal compound (B) is preferably 0.6 parts by mass or more and 20 parts by mass or less, more preferably 0.8 parts by mass or more and 20 parts by mass or less, further preferably 1.0 part by mass or more and 10 parts by mass or less, still further preferably 1.0 part by mass or more and 5 parts by mass or less, with respect to 100 parts by mass in total of the component (A) and a component (C3) (a crystalline thermoplastic resin having a lower melting point than that of the component (A) and/or an amorphous thermoplastic resin having a lower Vicat softening point than that of the component (A)) mentioned later. When the content of the component (B) is 0.6 parts by mass or more with respect to 100 parts by mass in total of the component (A) and the component (C3), favorable strength tends to be able to be obtained. When the content of the component (B) is 20 parts by mass or less with respect to 100 parts by mass in total of the component (A) and the component (C3), stability during production tends to be enhanced.

In the polyamide resin composition contained in the molded article of the present embodiment, the content of alkali metal and/or alkaline earth metal compound particles having a particle size of 1 μm or larger is preferably 20% by mass or less, more preferably 15% by mass or less, further preferably 10% by mass or less, still further preferably 5% by mass or less, in the component (B) (alkali metal and/or alkaline earth metal compound).

When the content of alkali metal and/or alkaline earth metal compound particles having a particle size of 1 μm or larger is 20% by mass or less in the component (B), the molded article of the present embodiment tends to have better heat aging resistance.

In this context, the particle size of the alkali metal and/or alkaline earth metal compound (B) is preferably a particle size of the metal aluminate component present in the molded article (or the polyamide resin composition) of the present embodiment.

The particle size of the alkali metal and/or alkaline earth metal compound (B) in the polyamide resin composition can be measured, for example, by dissolving the polyamide resin composition in formic acid and measuring the particle size using a laser diffraction particle size distribution apparatus.

For controlling the content of particle of the alkali metal and/or alkali earth metal compound having a particle size of 1 μm or larger in the alkali metal and/or alkali earth metal component (B) to 20% by mass or less as described above, it is effective to mix the alkali metal and/or alkali earth metal compound (B) with the polyamide resin (A) in a state having a small amount of moisture.

Examples of such a method include a method which involves melt-kneading the alkali metal and/or alkali earth metal compound (B) with the polyamide resin (A) using an extruder.

On the other hand, if the alkali metal and/or alkali earth metal compound (B) is involved in the condensation polymerization step for the polyamide resin (A), the particle size of the alkali metal and/or alkali earth metal compound (B) might be increased. Specifically, it is preferred to isolate the polyamide resin (A) after the completion of the polymerization step for the polyamide resin (A), and mix the component (A) with the component (B) at the stage of melt-kneading, which is the step of producing the polyamide resin composition.

((C) At least one compound selected from group consisting of (C1) to (C3) given below)

The polyamide resin composition contained in the molded article of the present embodiment preferably contains at least one compound as a component (C) selected from the group consisting of the following (C1) to (C3):

(C1) a salt of one or more metal elements selected from the group consisting of groups 3, 4, 11, 13, and 14 of the periodic table, (C2) at least one organic heat stabilizer selected from the group consisting of a hindered phenol compound, a hindered amine compound, and an organic phosphorus compound, and (C3) a crystalline thermoplastic resin having a lower melting point than that of the component (A) and/or an amorphous thermoplastic resin having a lower Vicat softening point than that of the component (A).

Only one of these compounds may be used alone as the component (C), and two or more thereof are preferably used in combination from the viewpoint of further improving the heat aging resistance of the polyamide resin composition of the present embodiment.

<(C1) Salt of One or More Metal Elements Selected from Group Consisting of Groups 3, 4, 11, 13, and 14 of Periodic Table>

The polyamide resin composition contained in the molded article of the present embodiment preferably contains (C1) a salt of one or more metal elements selected from the group consisting of groups 3, 4, 11, 13, and 14 of the periodic table (hereinafter, also referred to as a component (C1) or simply as (C1)) from the viewpoint of improving heat aging resistance.

The salt of one or more metal elements selected from the group consisting of groups 3, 4, 11, 13, and 14 of the periodic table is not particularly limited as long as the salt is a salt of metal element(s) belonging to these groups.

The salt (C1) of one or more metal elements selected from the group consisting of groups 3, 4, 11, 13, and 14 of the periodic table is preferably a copper salt from the viewpoint of further improving heat aging resistance.

Examples of the copper salt include, but are not limited to, copper halides (copper iodide, copper(I) bromide, copper(II) bromide, copper(I) chloride, etc.), copper acetate, copper propionate, copper benzoate, copper adipate, copper terephthalate, copper isophthalate, copper salicylate, copper nicotinate, and copper stearate, and copper complex salts containing copper coordinated with chelating agents such as ethylenediamine and ethylenediaminetetraacetic acid.

Only one of these copper salts may be used alone, or two or more thereof may be used in combination.

Among the copper salts listed above, one or more selected from the group consisting of copper iodide, copper(I) bromide, copper(II) bromide, copper(I) chloride, and copper acetate are preferred, and copper iodide and/or copper acetate are more preferred.

In the case of using the copper salt as the component (C1), the resulting polyamide resin composition tends to be excellent in heat aging resistance and be able to effectively suppress the metal corrosion of a screw or cylinder portion during extrusion (hereinafter, also simply referred to as "metal corrosion").

The content of the component (C1) in the polyamide resin composition contained in the molded article of the present embodiment when the (C1) is selected as a component contained therein is preferably 0.001 to 0.05 parts by mass as the content based on the metal element in the (C1) with respect to 100 parts by mass in total of the component (A) and the component (C3) which are thermoplastic resins. The content based on the metal element is more preferably 0.003 to 0.05 parts by mass, further preferably 0.005 to 0.03 parts by mass. When the content of the component (C1) is 0.001 parts by mass or more, heat aging resistance tends to be excellent. When the content of the component (C1) is 0.05 parts by mass or less, productivity tends to be excellent.

In the case of particularly using the copper salt as the component (C1), the content of the metal element of the copper salt in the polyamide resin composition of the present embodiment is preferably 0.001 to 0.05 parts by mass, more preferably 0.003 to 0.05 parts by mass, further preferably 0.005 to 0.03 parts by mass, with respect to 100 parts by mass in total of the component (A) and the component (C3) which are thermoplastic resins. When the content of the copper salt falls within the aforementioned range, heat aging resistance tends to be able to be further improved while copper deposition or metal corrosion tends to be able to be effectively suppressed.

The polyamide resin composition contained in the molded article of the present embodiment preferably contains 1 part by mass or more of the alkali metal and/or alkali earth metal compound (B) with respect to 1 part by mass of the salt (C1) of one or more metal elements selected from the group consisting of groups 3, 4, 11, 13, and 14 of the periodic table, i.e., the mass ratio of the component (B) to the component (C1) ((B)/(C1)) is 1 or more, from the viewpoint of improvement in heat aging resistance.

The content of the component (B) with respect to 1 part by mass of the component (C1) is more preferably 5 parts by mass or more and 500 parts by mass or less, further preferably 15 parts by mass or more and 500 parts by mass or less, still further preferably 25 parts by mass or more and 500 parts by mass or less, still further preferably 35 parts by mass or more and 500 parts by mass or less, particularly preferably 45 parts by mass or more and 500 parts by mass or less, from the viewpoint of better heat aging resistance and productivity.

<(C1-2) Halide of Alkali Metal and/or Halide of Alkaline Earth Metal>

The polyamide resin composition contained in the molded article of the present embodiment preferably contains (C1-2) a halide of an alkali metal and/or a halide of an alkaline earth metal (hereinafter, also referred to as a component (C1-2) or simply as (C1-2)) from the viewpoint of improvement in heat aging resistance.

Examples of the halide of an alkali metal and/or the halide of an alkaline earth metal include, but are not limited to, potassium iodide, potassium bromide, potassium chloride, sodium iodide, and sodium chloride, and mixtures thereof.

Among them, potassium iodide and/or potassium bromide are preferred, and potassium iodide is more preferred, from the viewpoint of improvement in heat aging resistance and the suppression of metal corrosion.

The content of the component (C1-2) in the polyamide resin composition contained in the molded article of the present embodiment is preferably 0.05 to 5 parts by mass, more preferably 0.2 to 2 parts by mass, with respect to 100 parts by mass in total of the component (A) and the component (C3) which are thermoplastic resins.

When the content of the component (C1-2) falls within the aforementioned range, heat aging resistance tends to be able to be further improved while copper deposition or metal corrosion tends to be able to be effectively suppressed.

Only one of these components (C1) and components (C1-2) may be used alone, or two or more thereof may be used in combination.

Among others, the copper salt as the component (C1) and the halide of an alkali metal and/or the halide of an alkaline earth metal as the component (C1-2) are preferably used in combination, from the viewpoint of further improving heat aging resistance.

The molar ratio of the halogen element of the component (C1-2) to the metal element of the component (C1) (halogen element/metal element) is preferably 2 to 50, more preferably 2 to 40, further preferably 5 to 30. When the molar ratio falls within the aforementioned range, heat aging resistance tends to be able to be further improved.

<(C2) at Least One Organic Heat Stabilizer Selected from Group Consisting of Hindered Phenol Compound, Hindered Amine Compound, and Organic Phosphorus Compound>

The polyamide resin composition contained in the molded article of the present embodiment preferably contains (C2) at least one organic heat stabilizer selected from the group consisting of a hindered phenol compound, a hindered amine compound, and an organic phosphorus compound (hereinafter, also referred to as a component (C2) or simply as (C2)) from the viewpoint of improving heat aging resistance.

[Hindered Phenol Compound]

Examples of the hindered phenol compound as the component (C2) include, but are not limited to, N,N'-hexamethylenebis[3-(3,5-di-tert-butyl-4-hydroxyphenyl)propanamide], triethylene glycol-bis[3-(3-t-butyl-5-methyl-4-hydroxyphenyl) propionate, 4,4'-butylidenebis(3-methyl-6-t-butylphenol), 1,6-hexanediol-bis[3-(3,5-di-t-butyl-4-hydroxyphenyl) propionate, 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl) propionate], 2,2-thio-diethylenebis[3-(3,5-di-t-butyl-4-hydroxyphenyl) propionate], octadecyl-3-(3,5-di-t-butyl-4-hydroxyphenyl) propionate, 2,2-thiobis(4-methyl-6-1-butylphenol), N,N'-hexamethylenebis(3,5-di-t-butyl-4-hydroxyhydrocinnamide), 3,5-di-t-butyl-4-hydroxybenzylphosphonate-diethyl ester, 1,3,5-trimethyl-2,4,6-tris(3,5-di-butyl-4-hydroxybenzyl)benzene, ethyl calcium bis (3,5-di-t-butyl-4-hydroxybenzylsulfonate), tris-(3,5-di-t-butyl-4-hydroxybenzyl)-isocyanurate, 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-methylenebis-(4-methyl-6-t-butylphenol), 2,2'-methylene-bis-(4-ethyl-6-t-butylphenol), 4,4'-thiobis-(3-methyl-6-t-butylphenol), octylated diphenylamine, 2,4-bis[(octylthio)methyl]-o-cresol, isooctyl-3-(3,5-di-t-butyl-4-hydroxyphenyl) propionate, 4,4'-butylidenebis(3-methyl-6-t-butylphenol, 3,9-bis[1,1-dimethyl-2-[β-(3-t-butyl-4-hydroxy-5-methylphenyl)propionyloxy]ethyl]2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t- butyl-4-hydroxybenzyl)benzene, bis[3,3'-bis-(4'-hydroxy-3'-t-butylphenyl)butyric acid] glycol ester, 1,3,5-tris(3',5'-di-t-butyl-4'-hydroxybenzyl)-sec-triazine-2,4,6-(1H,3H,5H)tri-one, and d-α-tocopherol.

Only one of these hindered phenol compounds may be used alone, or two or more thereof may be used in combination.

[Hindered Amine Compound]

Examples of the hindered amine compound as the component (C2) include, but are not limited to, succinic acid/dimethyl-1-(2-hydroxyethyl)-4-hydroxy-2,2,6,6-tetramethylpiperidine polycondensates, poly[{6-(1,1,3,3-tetramethylbutyl)amino-1,3,5-triazine-2,4-diyl}{(2,2,6,6,-tetramethyl-4-piperidyl)imino}hexamethylene{(2,2,6,6,-tetramethyl-4-piperidyl)imino}], bis(1,2,2,6,6-pentamethyl-4-piperidyl) 2-(3,5-di-t-butyl-4-hydroxybenzyl)-2-n-butylmalonate, tetrakis(2,2,6,6-tetramethyl-4-piperidyl)1,2,3,4-butane tetracarboxylate, bis-2,2,6,6-tetramethyl-4-piperidyl-sebacate, bis(1,2,2,6,6-pentamethyl-4-piperidyl) sebacate, methyl(1,2,2,6,6-pentamethyl-4-piperidyl) sebacate, 1-[2-[3-(3,5-di-t-butyl-4-hydroxyphenyl)propionyloxy]ethyl]-4-[3-(3,5-t-butyl-hydroxyphenyl)propionyloxy] 2,2,6,6-tetramethylpiperidine, and 4-benzoyloxy-2,2,6,6-tetramethylpiperidine.

Only one of these hindered amine compounds may be used alone, or two or more thereof may be used in combination.

[Organic Phosphorus Compound]

Examples of the organic phosphorus compound as the component (C2) include, but are not limited to, tetrakis(2,4-di-t-butylphenyl)-4,4'-biphenylene phosphonite, bis(2,6-di-t-butyl-4-methylphenyl)pentaerythritol-di-phosphite, 2,2-methylenebis(4,6-di-t-butylphenyl)octyl phosphite, triphenylphosphite, tris(2,4-di-t-butylphenyl)phosphite, diphenyl isodecyl phosphite, phenyl diisodecyl phosphite, 4,4-butylidene-bis(3-methyl-6-t-butylphenyl-di-tridecyl) phosphite, cyclic neopentanetetraylbis(octadecylphosphite), cyclic neopentanetetraylbis(2,6-di-t-butyl-4-methylphenyl) phosphite, tris(nonyl/phenyl)phosphite, diisodecyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene.

Only one of these organic heat stabilizers may be used alone as at least one organic heat stabilizer selected from the group consisting of a hindered phenol compound, a hindered amine compound, and an organic phosphorus compound, or two or more thereof may be used in combination.

Among the organic heat stabilizers listed above as the component (C2), a hindered phenol compound is preferred, and N,N'-hexamethylenebis[3-(3,5-di-tert-butyl-4-hydroxyphenyl)propanamide] is more preferred. In the case of using the hindered phenol compound, the resulting molded article tends to produce better heat aging resistance.

The polyamide resin composition contained in the molded article of the present embodiment preferably contains 0.8 to 20 parts by mass of the at least one organic heat stabilizer (C2) selected from the group consisting of a hindered phenol compound, a hindered amine compound, and an organic phosphorus compound with respect to 100 parts by mass of the thermoplastic resins (the total of the component (A) and the component (C3)) when the component (C2) is selected as a component contained therein, from the viewpoint of heat aging resistance and productivity.

The content of the (C2) is more preferably 1 part by mass or more and 10 parts by mass or less, further preferably 1.5 parts by mass or more and 10 parts by mass or less, still further preferably 2.5 parts by mass or more and 10 parts by mass or less, still further preferably 4 parts by mass or more and 10 parts by mass or less, still further preferably 6 parts by mass or more and 10 parts by mass or less.

((C3) Crystalline Thermoplastic Resin Having Lower Melting Point than that of the Polyamide Resin (A) and/or Amorphous Thermoplastic Resin Having Lower Vicat Softening Point than that of the Polyamide Resin (A))

The polyamide resin composition contained in the molded article of the present embodiment preferably contains (C3) a crystalline thermoplastic resin having a lower melting point than that of the polyamide resin (A) and/or an amorphous thermoplastic resin having a lower Vicat softening point than that of the polyamide resin (A) (hereinafter, also referred to as a "component (C3)") from the viewpoint of improving heat aging resistance.

Examples of the component (C3) include a crystalline thermoplastic resin having a lower melting point than that of the component (A) and an amorphous thermoplastic resin having a lower Vicat softening point than that of the component (A) as mentioned later, and thermoplastic elastomers.

Examples of the component (C3) include, but are not limited to, polyolefin resins such as polyethylene and polypropylene, polyphenylene ether, thermoplastic polyester resins, polyamide resins, polylactic acid resins, polystyrene, polyvinyl chloride, acrylic resins, polycarbonate resins, polyacetal resins, and fluorine resins such as polytetrafluoroethylene.

The component (C3) is preferably a crystalline thermoplastic resin having a lower melting point than that of the component (A) from the viewpoint of initial strength. For example, a polyamide resin or a thermoplastic polyester resin is preferred, and a polyamide resin is more preferred.

Only one of these thermoplastic resins may be used alone as the component (C3), or two or more thereof may be used in combination.

The content of the component (C3) in the polyamide resin composition contained in the molded article of the present embodiment when the component (C3) is selected as a component contained therein is preferably 1 to 50 parts by mass with respect to 100 parts by mass in total of the component (A) and the component (C3) which are thermoplastic resins. When the content of the component (C3) falls within the aforementioned range, rigidity under high-temperature conditions can be maintained while high heat aging resistance tends to be able to be exerted. The content of the component (C3) is more preferably 5 parts by mass or more and 50 parts by mass or less, further preferably 10 parts by mass or more and 40 parts by mass or less, with respect to 100 parts by mass in total of the component (A) and the component (C3) from the viewpoint of the balance between high-temperature rigidity and heat aging resistance.

A polyamide resin having a melting point of lower than 240° C. is preferably used as the component (C3), and a polyamide resin having a melting point of lower than 230° C. is more preferably used, from the viewpoint of improvement in heat aging resistance.

Likewise, polyamide 6 and/or a polyamide resin in which the ratio of the number of carbon atoms to the number of nitrogen atoms (C/N) contained therein is 7 or more and 20 or less are more preferably used as the component (C3) from the viewpoint of improvement in heat aging resistance. Examples of the polyamide resin in which the ratio of the number of carbon atoms to the number of nitrogen atoms (C/N) contained therein is 7 or more and 20 or less include, but are not limited to, PA610 and PA612.

When the thermoplastic resin used as the component (C3) is amorphous, its Vicat softening point is lower than that of the aforementioned polyamide resin (A) from the viewpoint of further improvement in heat aging resistance. The Vicat softening point of the component (C3) is preferably 235° C. or lower, more preferably 230° C. or lower, further preferably 220° C. or lower.

Examples of the thermoplastic polyester resin that can be used as the component (C3) include, but are not limited to, polyethylene terephthalate resins and polybutylene terephthalate resins.

The component (C3) is preferably, as mentioned above, a polyamide resin in which the ratio of the number of carbon atoms to the number of nitrogen atoms (C/N) contained in the component (C3) is 7 or more and 20 or less from the viewpoint of improvement in heat aging resistance. The ratio of the number of carbon atoms to the number of nitrogen atoms (C/N) is preferably 7 or more and 18 or less, more preferably 8 or more and 16 or less.

The melting point of the thermoplastic resin can be measured according to JIS-K7121.

For example, Diamond DSC manufactured by PerkinElmer Inc. can be used as a measurement apparatus.

The Vicat softening point of the thermoplastic resin can be measured according to JIS-K7206.

The method for calculating the content of the component (C3) will be described.

For example, when the content of the component (A) in the polyamide resin composition is 80 kg and the content of the component (C3) therein is 20 kg, the content of the component (C3) is 20 kg with respect to 100 kg of the thermoplastic resin components (the total of the component (A) and the component (C3)). In the present specification, this is indicated by containing 20 parts by mass of the component (C3) with respect to 100 parts by mass of the thermoplastic resin components (the total of the component (A) and the component (C3)).

((D) Inorganic Filler Except for Alkali Metal and/or Alkali Earth Metal Compound)

The polyamide resin composition contained the molded article of the present embodiment preferably contains (D) an inorganic filler except for an alkali metal and/or alkali earth metal compound (hereinafter, also referred to as an inorganic filler (D) or a component (D)) from the viewpoint of improving heat aging resistance.

The content of the component (D) is preferably 10 parts by mass or more and 250 parts by mass or less, more preferably 10 parts by mass or more and 150 parts by mass or less, further preferably 15 parts by mass or more and 100 parts by mass or less, with respect to 100 parts by mass of the thermoplastic resin components (the total of the component (A) and the component (C3)). When the content of the component (D) falls within the aforementioned range, the polyamide resin composition of the present embodiment tends to have better flowability and appearance characteristics.

Examples of the inorganic filler (D) except for an alkali metal and/or alkali earth metal compound include, but are not limited to, glass fibers, carbon fibers, calcium silicate fibers, potassium titanate fibers, aluminum borate fibers, glass flakes, talc, kaolin, mica, hydrotalcite, zinc carbonate, zinc oxide, calcium monohydrogen phosphate, wollastonite, silica, zeolite, alumina, boehmite, aluminum hydroxide, titanium oxide, silicon oxide, magnesium oxide, calcium silicate, sodium aluminosilicate, magnesium silicate, ketjen black, acetylene black, farness black, carbon nanotubes, graphite, yellow copper, copper, silver, aluminum, nickel, iron, calcium fluoride, mica isinglass, montmorillonite, swellable fluorine mica, and apatite.

Among them, glass fibers having a circular or non-circular cross section, glass flakes, talc (magnesium silicate), mica, kaolin, wollastonite, titanium oxide, calcium phosphate, calcium carbonate, or calcium fluoride is preferred from the viewpoint of enhancing the strength and rigidity of the polyamide resin composition of the present embodiment, glass fibers, wollastonite, talc, mica, or kaolin is more preferred, and glass fibers is further preferred.

One or more of these inorganic fillers may be used alone as the component (D), or two or more thereof may be used in combination.

The glass fibers or the carbon fibers further preferably have a number-average fiber diameter of 3 to 30 μm, a weight-average fiber length of 100 to 750 μm, and a weight-average fiber length/number-average fiber diameter aspect ratio (a value obtained by dividing the weight-average fiber length by the number-average fiber diameter) of 10 to 100 from the viewpoint that excellent mechanical characteristics can be imparted to the polyamide resin composition.

The wollastonite preferably has a number-average fiber diameter of 3 to 30 μm, a weight-average fiber length of 10 to 500 μm, and a weight-average fiber length/number-average fiber diameter aspect ratio of 3 to 100 from the viewpoint that excellent mechanical characteristics can be imparted to the polyamide resin composition of the present embodiment.

The talc, the mica, or the kaolin preferably has a number-average fiber diameter of 0.1 to 3 μm from the viewpoint that excellent mechanical characteristics can be imparted to the polyamide resin composition of the present embodiment.

In this context, the number-average fiber diameter and the weight-average fiber length described can be determined as follow.

Specifically, the polyamide resin composition is placed in an electric furnace, and the organic matter contained therein is incinerated. For example, 100 or more filaments of the inorganic filler (D) are arbitrarily selected from the residue and observed by SEM. Their fiber diameters are measured, and an average value can be calculated to determine the number-average fiber diameter.

Also, the fiber lengths are measured using a SEM photograph taken at a magnification of ×1000, and the weight-average fiber length can be determined according to a predetermined expression (Weight-average fiber length=$\Sigma$ (I=1→n) (Fiber length of the nth fiber)$^2$/$\Sigma$(I=1→n)(Fiber length of the nth fiber), wherein n represents the number of measured fibers).

The inorganic filler (D) may be surface-treated with a silane coupling agent or the like.

Examples of the silane coupling agent include, but are not limited to: aminosilanes such as γ-aminopropyltriethoxysilane, γ-aminopropyltrimethoxysilane, and N-β-(aminoethyl)-γ-aminopropylmethyldimethoxysilane; mercaptosilanes such as γ-mercaptopropyltrimethoxysilane and γ-mercaptopropyltriethoxysilane; epoxysilanes; and vinylsilanes.

Only one of these silane coupling agents may be used alone, or two or more thereof may be used in combination. Among the silane coupling agents, an aminosilane is more preferred from the viewpoint of affinity for resins.

In the case of using the glass fibers as the inorganic filler (D), the glass fibers preferably further contain a sizing agent. The sizing agent is a component that is applied to the surface of the glass fibers. Examples of the sizing agent include copolymers containing a carboxylic anhydride-containing unsaturated vinyl monomer and an unsaturated vinyl monomer other than the carboxylic anhydride-containing unsaturated vinyl monomer as constitutional units, epoxy compounds, polycarbodiimide compounds, polyurethane resins, acrylic acid homopolymers, copolymers of acrylic acid and an additional copolymerizable monomer, and salts thereof with primary, secondary, and tertiary amines.

Only one of these sizing agents may be used alone, or two or more thereof may be used in combination.

Among them, a copolymer containing a carboxylic anhydride-containing unsaturated vinyl monomer and an unsaturated vinyl monomer other than the carboxylic anhydride-containing unsaturated vinyl monomer as constitutional units, an epoxy compound, a polycarbodiimide compound, or a polyurethane resin, or a combination thereof is preferred, and a copolymer containing a carboxylic anhydride-containing unsaturated vinyl monomer and an unsaturated vinyl monomer other than the carboxylic anhydride-containing unsaturated vinyl monomer as constitutional units is more preferred, from the viewpoint of the mechanical strength of the molded article of the present embodiment.

Examples of the carboxylic anhydride-containing unsaturated vinyl monomer in the copolymer containing a carboxylic anhydride-containing unsaturated vinyl monomer and an unsaturated vinyl monomer other than the carboxylic anhydride-containing unsaturated vinyl monomer as constitutional units include, but are not limited to, maleic anhydride, itaconic anhydride, and citraconic anhydride. Among them, maleic anhydride is preferred.

On the other hand, the unsaturated vinyl monomer other than the carboxylic anhydride-containing unsaturated vinyl monomer refers to an unsaturated vinyl monomer that is different from the carboxylic anhydride-containing unsaturated vinyl monomer.

Examples of the unsaturated vinyl monomer other than the carboxylic anhydride-containing unsaturated vinyl monomer include, but are not limited to, styrene, α-methylstyrene, ethylene, propylene, butadiene, isoprene, chloroprene, 2,3-dichlorobutadiene, 1,3-pentadiene, cyclooctadiene, methyl methacrylate, methyl acrylate, ethyl acrylate, and ethyl methacrylate. Among them, styrene or butadiene is preferred.

Among their combinations, one or more selected from the group consisting of a copolymer of maleic anhydride and butadiene, a copolymer of maleic anhydride and ethylene, and a copolymer of maleic anhydride and styrene, and mixtures thereof are more preferred.

The copolymer containing a carboxylic anhydride-containing unsaturated vinyl monomer and an unsaturated vinyl monomer other than the carboxylic anhydride-containing unsaturated vinyl monomer as constitutional units preferably has a weight-average molecular weight of 2000 or higher from the viewpoint of improvement in the flowability of the polyamide resin composition of the present embodiment. The upper limit of the weight-average molecular weight is preferably 1000000 or lower. The weight-average molecular weight can be measured by GPC (gel permeation chromatography).

Examples of the epoxy compound include, but are not limited to: aliphatic epoxy compounds such as ethylene oxide, propylene oxide, butene oxide, pentene oxide, hexene oxide, heptene oxide, octene oxide, nonene oxide, decene oxide, undecene oxide, dodecene oxide, pentadecene oxide, and eicosene oxide; alicyclic epoxy compounds such as glycidol, epoxypentanol, 1-chloro-3,4-epoxybutane, 1-chloro-2-methyl-3,4-epoxybutane, 1,4-dichloro-2,3-epoxybutane, cyclopentene oxide, cyclohexene oxide, cycloheptene oxide, cyclooctene oxide, methylcyclohexene oxide, vinylcyclohexene oxide, and epoxidized cyclohexene methyl alcohol; terpene epoxy compounds such as pinene oxide; aromatic epoxy compounds such as styrene oxide, p-chlorostyrene oxide, and m-chlorostyrene oxide; epoxidized soybean oil; and epoxidized flaxseed oil.

The polycarbodiimide compound is a compound containing one or more carbodiimide groups (—N=C=N—), i.e., a compound obtained by the condensation of carbodiimide compounds.

The degree of condensation for the polycarbodiimide compound is preferably 1 to 20, more preferably 1 to 10. When the degree of condensation falls within the range of 1 to 20, a favorable aqueous solution or aqueous dispersion tends to be obtained. When the degree of condensation falls within the range of 1 to 10, a more favorable aqueous solution or aqueous dispersion tends to be obtained.

The polycarbodiimide compound is preferably a polycarbodiimide compound partially having a polyol segment. The polycarbodiimide compound partially having a polyol segment is easily solubilized and can be used more preferably as the sizing agent for the glass fibers or the carbon fibers.

The polycarbodiimide compound, i.e., the compound containing various carbodiimide groups (—N=C=N—) as described above, can be obtained by the decarboxylation reaction of a diisocyanate compound in the presence of a carbodiimidization catalyst known in the art such as 3-methyl-1-phenyl-3-phospholene-1-oxide.

An aromatic diisocyanate, an aliphatic diisocyanate, or an alicyclic diisocyanate, or a mixture thereof can be used as the diisocyanate compound.

Examples of the diisocyanate compound include, but are not limited to, 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl diisocyanate, and 1,3,5-triisopropylbenzene-2,4-diisocyanate.

These diisocyanate compounds are carbodiimidized to be able to obtain carbodiimide compounds having two isocyanate groups at their ends. Of them, dicyclohexylmethane diisocyanate can be preferably used from the viewpoint of improvement in reactivity.

Alternatively, a polycarbodiimide compound having one isocyanate group at the end can be obtained by, for example, a method which involves carbodiimidizing monoisocyanate compounds in equimolar amounts or a method which involves reacting a monoisocyanate compound with a polyalkylene glycol monoalkyl ether in equimolar amounts to form an urethane bond Examples of the monoisocyanate compound include, but are not limited to, hexyl isocyanate, phenyl isocyanate, and cyclohexyl isocyanate.

Examples of the polyalkylene glycol monoalkyl ether include, but are not limited to, polyethylene glycol monomethyl ether and polyethylene glycol monoethyl ether.

The polyurethane resin can be any of those generally used as the sizing agent. Examples thereof include, but are not limited to, polyurethane resins synthesized from an isocyanate such as m-xylylene diisocyanate (XDI), 4,4'-methylenebis(cyclohexyl isocyanate) (HMDI), or isophorone diisocyanate (IPDI), and a polyester or polyether diol.

The acrylic acid homopolymers (polyacrylic acids) preferably have a weight-average molecular weight of 1000 to 90000, more preferably 1000 to 25000, from the viewpoint of affinity for resins.

Examples of the "additional copolymerizable monomer" constituting the copolymers of acrylic acid and an additional copolymerizable monomer include, but are not limited to, one or more selected from acrylic acid, maleic acid, methacrylic acid, vinylacetic acid, crotonic acid, isocrotonic acid, fumaric acid, itaconic acid, citraconic acid, and mesaconic acid (except for the case where the additional copolymerizable monomer is acrylic acid alone) among monomers having a hydroxy group and/or a carboxyl group.

Of these monomers, one or more ester monomers are preferably used.

The aforementioned polymer (including both of the homopolymer and the copolymer) of acrylic acid may be in the form of a salt. Examples of the salt of the acrylic acid polymer include, but are not limited to, salts with primary, secondary, and tertiary amines. Specific examples thereof include salts with triethylamine, triethanolamine, and glycine.

The degree of neutralization of the polymer of acrylic acid is set to preferably 20 to 90%, more preferably 40 to 60%, from the viewpoint of improvement in the stability of a mixed solution with other agents used in combination therewith (silane coupling agent, etc.) or reduction in amine odor.

The weight-average molecular weight of the acrylic acid polymer that forms a salt is not particularly limited and is preferably in the range of 3000 to 50000. The weight-average molecular weight is preferably 3000 or higher from the viewpoint of improvement in glass fiber or carbon fiber sizing properties and is preferably 50000 or lower from the viewpoint of further improvement in the mechanical characteristics of the polyamide resin composition of the present embodiment.

Examples of the method for treating the glass fibers or the carbon fibers with various sizing agents mentioned above include a method which involves applying each of the aforementioned sizing agents to the glass fibers or the carbon fibers using a method known in the art such as a roller-type applicator in the step of producing the glass fibers or the carbon fibers known in the art, and drying the fiber strand thus produced for continuous reaction.

The fiber strand may be used directly as a roving or may be used as a chopped glass strand through a further cutting step.

The sizing agent is preferably applied (added) at a solid content corresponding to 0.2 to 3 parts by mass, more preferably 0.3 to 2 parts by mass, with respect to 100 parts by mass of the glass fibers or the carbon fibers. The amount of the sizing agent added is preferably 0.2 parts by mass or more in terms of a solid content with respect to 100 parts by mass of the glass fibers or the carbon fibers from the viewpoint of maintaining the bundling of the glass fibers or the carbon fibers. On the other hand, the amount of the sizing agent added is preferably 3 parts by mass or less from the viewpoint of improvement in the heat stability of the polyamide resin composition contained in the molded article of the present embodiment.

The drying of the strand may be carried out after the cutting step, or the cutting step may be carried out after the drying of the strand.

(Additional Component that May be Contained in Polyamide Resin Composition)

The polyamide resin composition contained in the molded article of the present embodiment may further contain an additional component, if necessary, without impairing the effects of the present invention in addition to the aforementioned component (A) to component (D). Examples of the additional component include, but are not limited to, ultraviolet absorbers, light degradation inhibitors, plasticizers, lubricants, mold release agents, nucleating agents, flame retardants, colorants, staining agents, pigments, and other thermoplastic resins.

In this context, these additional components largely differ in their properties. Therefore, their preferred contents that hardly impair the effects of the present invention vary among these components. Those skilled in the art can readily set the respective preferred contents of these additional components.

[Method for Producing Polyamide Resin Composition]

The polyamide resin composition contained in the molded article of the present embodiment can be produced by mixing the polyamide resin (A) and the alkali metal and/or alkaline earth metal compound (B) as essential components and, if necessary, the at least one or more compounds (C) selected from the group consisting of the following (C1) to (C3):

(C1) a salt of one or more metal elements selected from the group consisting of groups 3, 4, 11, 13, and 14 of the periodic table, (C2) at least one organic heat stabilizer selected from the group consisting of a hindered phenol compound, a hindered amine compound, and an organic phosphorus compound, and (C3) a crystalline thermoplastic resin having a lower melting point than that of the component (A) and/or an amorphous thermoplastic resin having a lower Vicat softening point than that of the component (A), and further, if necessary, the component (C1-2) (the halide of an alkali metal and/or the halide of an alkaline earth metal), the inorganic filler (D) except for an alkali metal and/or alkaline earth metal compound, and the additional component.

In the production of the polyamide resin composition contained in the molded article of the present embodiment, a method can be preferably used which involves kneading the alkali metal and/or alkaline earth metal compound (B) and, if necessary, the component (C) in a melted state of the polyamide resin (A) using a single-screw or multiple-screw extruder.

Alternatively, a method can be used which involves well stirring and mixing in advance an aqueous solution of the alkali metal and/or alkaline earth metal compound (B) and pellets of the polyamide resin (A), followed by dehydration, supplying the polyamide resin pellets prepared by this approach and the component (C) from a feed port of an extruder, and melt-kneading the mixture.

The addition of the alkali metal and/or alkaline earth metal compound (B) is preferably carried out by a method which involves kneading the alkali metal and/or alkaline earth metal compound (B) in a melted state of the polyamide resin (A) using a single-screw or multiple-screw extruder, from the viewpoint of the dispersibility of the alkali metal and/or alkaline earth metal compound (B).

[Method for Producing Molded Article and Use]

The molded article of the present embodiment is obtained, for example, by the injection molding of the polyamide resin composition, without particular limitations. The obtained molded article is heat-treated so that alkali metal and/or alkaline earth metal elements can be unevenly distributed in a region within a depth of 3 μm from the surface of the molded article. The conditions of this heat treatment preferably involve, for example, 230° C. for 300 hours or longer.

The conditions more preferably involve 230° C. for 500 hours or longer from the viewpoint of high-temperature physical properties. Also, the conditions preferably involve 230° C. for 3000 hours or shorter from the viewpoint of high-temperature physical properties. Under the heat treatment conditions, continuous treatment may be carried out at the aforementioned temperature. Alternatively, the aforementioned temperature may be kept for a given time, followed by cooling and heating so that the aforementioned temperature is kept again. This operation can be repeated such that the total time for which the aforementioned temperature is kept reaches the aforementioned treatment time.

The molded article according to the present embodiment can be preferably used as material parts for various uses, for example, for automobiles, for machinery industry, for electric or electronic uses, for industrial materials, for engineering materials, and for daily necessities or domestic articles, without particular limitations. The molded article of the present embodiment is particularly preferably used as a material part for automobiles, such as an automobile underhood part or a hollow part.

The molded article of the present embodiment has practically sufficient high-temperature mechanical characteristics even when used for a long time under high-temperature conditions.

EXAMPLES

Hereinafter, the present invention will be described in detail with reference to specific Examples and Comparative Examples. However, the present invention is not intended to be limited by Examples below.

The following measurement methods were used for evaluating samples according to Examples and Comparative Examples.

[Measurement Method]
(Relative Viscosity in 98% Sulfuric Acid ($\eta r$))

In Examples and Comparative Examples (hereinafter, also simply referred to as "each example") mentioned later, the relative viscosity in 98% sulfuric acid ($\eta r$) of the polyamide resin (A) was measured according to JISK6920.

(Melting Point)

In Examples and Comparative Examples mentioned later, the melting point of the crystalline resin was measured as follows according to JIS-K7121 using Diamond-DSC manufactured by PerkinElmer Inc.

The measurement was carried out in a nitrogen atmosphere.

Approximately 10 mg of each sample was heated from 50° C. to 300° C. at a rate of temperature increase of 20° C./min. The endothermic peak temperature that appeared here was used as the melting point.

(Vicat Softening Point)

Each test specimen of 4 mm thick was used in measurement according to ISO 306 B50 to determine the Vicat softening point (° C.).

(Terminal Group Concentration)

In Examples and Comparative Examples mentioned later, the terminal group concentrations (terminal amino group concentration and terminal carboxyl group concentration) of the polyamide resin (A) were determined by 1H-NMR measurement at 60° C. using a bisulfate solvent.

The measurement apparatus used was ECA500 manufactured by JEOL Ltd. The terminal group concentrations were calculated from the integrated values of peaks corresponding to the terminal amino groups and the terminal carboxyl groups in the polyamide resin (A) to obtain (terminal amino group concentration/terminal carboxyl group concentration).

(Tensile Strength)

Pellets of the polyamide resin composition produced in each of Examples and Comparative Examples were molded into a molded piece as a multipurpose test specimen (type A) according to ISO 3167 using an injection molding machine (PS-40E; manufactured by Nissei Plastic Industrial Co., Ltd.).

In this operation, the injection and pressure keeping time was set to 25 seconds, and the cooling time was set to 15 seconds.

The mold temperature and the cylinder temperature were set to the temperatures described in the production examples of the polyamide resin (A) mentioned later.

The obtained multipurpose test specimen (type A) was treated under the conditions described in Tables 1 to 5. The test specimen was used in the tensile test at a rate of pulling of 5 mm/min according to ISO 527 to measure the tensile strength (MPa).

(Tensile strength at 180° C. and 200° C.) The multipurpose test specimen (type A) in the preceding paragraph (Tensile strength) was treated under the conditions described in Tables 1 to 5. The test specimen was used in the tensile test at a rate of pulling of 5 mm/min according to ISO 527 at 180° C. or 200° C. to measure the tensile strength (MPa) at 180° C. and 200° C.

(Flexural Modulus)

The multipurpose test specimen (type A) mentioned above was treated under the conditions described in Tables 1 to 5. The test specimen was used in the bending strength measurement of the molded piece corresponding to each example according to JIS K7171 at 23° C.

(Flexural Modulus at 180° C. and 200° C.)

The multipurpose test specimen (type A) mentioned above was treated under the conditions described in Tables 1 to 5. The test specimen was used in the bending strength measurement of the molded piece corresponding to each example according to JIS K7171 at 180° C. or 200° C.

(Evaluation of Concentration of Alkali Metal and/or Alkaline Earth Metal Elements within 3 μm Deep from Surface)

SEM (scanning electron microscopy)-EDX (energy dispersive X-ray spectroscopy) was used as the method for measuring the average concentration of alkali metal and/or alkaline earth metal elements in the molded article.

The molded article comprising a polyamide resin composition was cut in a direction perpendicular to the surface. The cut surface was smoothed using a diamond knife.

The sample was mounted to a stage for SEM observation using a carbon tape, treated for conduction, and subjected to SEM-EDX measurement.

In the EDX observation, the detected intensity of the alkali metal and/or alkaline earth metal elements in a region within a depth of 3 μm from the surface of the sample and the detected intensity of the alkali metal and/or alkaline earth metal elements in a region except for the region within a depth of 3 μm from the surface of the sample in the measured field of view were defined as the respective relative average concentrations of the elements in the regions.

The detected intensity of the alkali metal and/or alkaline earth metal elements was defined as the amount of the alkali metal and/or alkaline earth metal elements detected in a given area in the measured region for a given measurement time.

The ratio between the relative average concentrations of the elements measured above was used as "(the average concentration of alkali metal and/or alkaline earth metal elements in a region within a depth of 3 μm from the surface of the molded article)/(the average concentration of alkali metal and/or alkaline earth metal elements in a region except for the region within a depth of 3 μm from the surface of the molded article)". The ratio is shown as "Evaluation of concentration of alkali metal and/or alkaline earth metal within 3 μm deep from surface" in Tables 1 to 5 below, and indicated by ○ when being larger than 2 and by X when being 2 or less.

(Evaluation of lower carboxylate of alkali metal and/or alkaline earth metal within 1 μm deep from surface)

The method for measuring a lower carboxylate of an alkali metal and/or an alkaline earth metal present in a region within a depth of 1 μm from the surface of the molded article will be described.

ATR (attenuated total reflectance) and ion chromatography/mass spectrometry were used in the measurement.

In the ATR, the penetration depth of light into a sample was adjusted by changing the angle of incidence and the refractive index of a prism.

The presence or absence of the lower carboxylate of an alkali metal and/or an alkaline earth metal in a region within a depth of 1 μm from the surface of the molded article was confirmed by use of ATR.

Specifically, the presence or absence of peaks was confirmed.

In addition, the region within a depth of 1 μm from the surface of the molded article was measured by ion chromatography/mass spectrometry to confirm the presence or absence of the lower carboxylate.

Specifically, the presence or absence of peaks was confirmed.

The obtained evaluation results are shown as "Evaluation of lower carboxylate of alkali metal and/or alkaline earth metal within 1 μm deep from surface" in Tables 1 to 5 below, and indicated by ○ when the lower carboxylate of an alkali metal and/or an alkaline earth metal was present in the region within a depth of 1 μm from the surface and by X when this lower carboxylate was absent in the region within a depth of 1 μm from the surface.

(Evaluation of Carbonate of Alkali Metal and/or Alkaline Earth Metal within 10 nm Deep from Surface)

The method for measuring a carbonate of an alkali metal and/or an alkaline earth metal present in a region within a depth of 10 nm from the surface of the molded article will be described.

The measurement was carried out using X-ray photoelectron spectroscopy (XPS) to confirm the presence or absence of the carbonate of an alkali metal and/or an alkaline earth metal in a region within a depth of 10 nm from the surface of the molded article.

Specifically, the presence or absence of peaks was confirmed.

The obtained evaluation results are shown as "Evaluation of carbonate of alkali metal and/or alkaline earth metal within 10 nm deep from surface" in Tables 1 to 5 below, and indicated by ○ when the carbonate of an alkali metal and/or an alkaline earth metal was present in the region within a depth of 10 nm from the surface of the molded article and by X when this carbonate was absent in the region within a depth of 10 nm from the surface.

(Solid-state NMR peak evaluation)

Whether or not the molded article comprising a polyamide resin composition had one or more peaks each in ranges of 0 to 30 ppm, 30 to 60 ppm, and 70 to 100 ppm was confirmed by solid-state 27Al-NMR measurement.

The obtained evaluation results are shown as "Solid-state NMR peak evaluation" in Tables 1 to 5 below, and indicated by ○ when the molded article comprising a polyamide resin composition had one or more peaks each in ranges of 0 to 30 ppm, 30 to 60 ppm, and 70 to 100 ppm and by X when the molded article comprising a polyamide resin composition did not have one or more peaks each in these ranges by solid-state 27Al-NMR measurement.

(Weight-Average Molecular Weight (Mw) and Molecular Weight Distribution (Mw/Mn))

Mw and Mn of the molded article were measured by GPC (gel permeation chromatography). Mw/Mn was calculated using these values.

In the GPC, the molded article of each example was used as a sample for measurement, and hexafluoroisopropanol was used as a solvent for measurement. A measurement value based on PMMA was used.

The number-average molecular weight (Mn) and the weight-average molecular weight (Mw) of the molded article are obtained as measurement values of a polyamide resin contained in the molded article.

(Measurement of Soluble Content in Hexafluoroisopropanol (HFIP) of Polyamide Resin Portion Contained in Polyamide Resin Composition)

First, the molded article comprising a polyamide resin composition was incinerated, and the content of the inorganic matter was determined from the mass of the residue.

Specifically, the molded article was incinerated by heating at 650° C. for 3 hours in a crucible.

Next, the molded article comprising a polyamide resin composition was dissolved in hexafluoroisopropanol (HFIP). Specifically, 1 g of the molded article comprising a polyamide resin composition was dipped in 50 mL of HFIP and left at room temperature for 24 hours.

Then, a portion insoluble in HFIP was taken out and dried. Specifically, the insoluble portion was left at room temperature for 24 hours, then heated to 60° C. in nitrogen, and dried for 3 hours. Then, the mass was measured.

The soluble content in HFIP of the polyamide resin portion except for the inorganic matter was determined from the results of measuring the content of the inorganic matter mentioned above and the masses before and after the dissolution in HFIP, and is shown as "Amount of portion dissolved in HFIP" in Tables 1 to 5 below.

[Starting Material]

The following starting materials were used in Examples and Comparative Examples.

((A) Polyamide Resin)

<Polyamide Resin A-1 (PA66)>

30 kg of an aqueous solution of equimolar salts of 50% by mass of hexamethylenediamine and adipic acid was prepared and sufficiently stirred.

The aqueous solution of the starting materials for polyamide 66 (hereinafter, also simply referred to as an aqueous solution of the starting materials) was charged into a 70 L autoclave having a stirring apparatus and a discharge nozzle in a lower area.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of <polyamide resin A-1> was 2.8.

The terminal amino group concentration was 46 µmol/g, and the terminal carboxyl group concentration was 72 µmol/g.

Specifically, terminal amino group concentration/terminal carboxyl group concentration was 0.64.

The melting point was 264° C., and the Vicat softening point was 238° C.

The mold temperature and the cylinder temperature were set to 80° C. and 290° C., respectively, for molding the polyamide resin composition using <polyamide resin A-1>.

<Polyamide Resin A-2 (PA66)>

Additional 900 g of adipic acid was added to the aqueous solution of the starting materials.

Other conditions were set in the same way as in the method for producing <polyamide resin A-1> to produce <polyamide resin A-2>.

The relative viscosity in 98% sulfuric acid of <polyamide resin A-2> was 2.2.

The terminal amino group concentration was 33 µmol/g, and the terminal carboxyl group concentration was 107 µmol/g. Specifically, terminal amino group concentration/terminal carboxyl group concentration was 0.3.

The melting point was 264° C., and the Vicat softening point was 238° C.

The mold temperature and the cylinder temperature were set to 80° C. and 290° C., respectively, for molding the polyamide resin composition using <polyamide resin A-2>.

<Polyamide Resin A-3 (PA66)>

Additional 900 g of hexamethylenediamine was added to the aqueous solution of the starting materials.

Other conditions were set in the same way as in the method for producing <polyamide resin A-1> to produce <polyamide resin A-3>.

The relative viscosity in 98% sulfuric acid of <polyamide resin A-3> was 2.4. The terminal amino group concentration was 78 µmol/g, and the terminal carboxyl group concentration was 52 µmol/g. Specifically, terminal amino group concentration/terminal carboxyl group concentration was 1.5.

The melting point was 264° C., and the Vicat softening point was 238° C.

The mold temperature and the cylinder temperature were set to 80° C. and 290° C., respectively, for molding the polyamide resin composition using <polyamide resin A-3>.

<Polyamide Resin A-4 (PA66/6T)>

<Polyamide Resin A-4 (PA66/6T)> was produced according to the production example of National Publication of International Patent Application No. 2013-501094.

The relative viscosity in 98% sulfuric acid of <polyamide resin A-4> was 2.9.

The terminal amino group concentration was 42 µmol/g, and the terminal carboxyl group concentration was 65 µmol/g. Specifically, terminal amino group concentration/terminal carboxyl group concentration was 0.6.

The mold temperature and the cylinder temperature were set to 80° C. and 290° C., respectively, for molding the polyamide resin composition using <polyamide resin A-4>.

<Polyamide Resin A-5 (PA9T)>

<Polyamide Resin A-5 (PA9T)> was produced according to the production example of Japanese Patent Laid-Open No. 2013-40346.

The relative viscosity in 98% sulfuric acid of <polyamide resin A-5> was 2.9, and the melting point was 304° C.

The terminal amino group concentration was 42 µmol/g, and the terminal carboxyl group concentration was 52 µmol/g. Specifically, terminal amino group concentration/terminal carboxyl group concentration was 0.8.

The mold temperature and the cylinder temperature were set to 120° C. and 330° C., respectively, for molding the polyamide resin composition using <polyamide resin A-5>.

<Polyamide Resin A-6 (PA46)>

Stanyl(R) KS200 (trade name, manufactured by DSM Engineering Plastics, melting point: 290° C.) was used as polyamide 46 (hereinafter, abbreviated to "PA46").

The mold temperature and the cylinder temperature were set to 120° C. and 300° C., respectively, for molding the polyamide resin composition using <polyamide resin A-6>.

<Polyamide Resin A-7 (PA6)>

SF1013A manufactured by Ube Industries, Ltd. was used. The melting point was 224° C.

<Polyamide Resin A-8 (PA610)>

<Polyamide Resin A-8 (PA610)> was produced according to the production example of Japanese Patent Laid-Open No. 2011-148997. The melting point was 215° C.

(Alkali metal and/or alkaline earth metal compound (B))

<B-1: Sodium Aluminate>

Sodium aluminate manufactured by Wako Pure Chemical Industries, Ltd. was used.

<B-2: Sodium Bicarbonate>

Sodium bicarbonate manufactured by Tokyo Chemical Industry Co., Ltd. was used.

<B-3: Sodium Carbonate>

Sodium carbonate manufactured by Tokyo Chemical Industry Co., Ltd. was used.

<B-4: Potassium Carbonate>

Potassium carbonate manufactured by Tokyo Chemical Industry Co., Ltd. was used.

<B-5: Sodium Hydroxide>

Sodium hydroxide manufactured by Tokyo Chemical Industry Co., Ltd. was used.

<B-6: Trisodium Citrate>

Trisodium citrate manufactured by Tokyo Chemical Industry Co., Ltd. was used.

<B-7: Tetrasodium Ethylenediaminetetraacetate>

Tetrasodium ethylenediaminetetraacetate manufactured by Tokyo Chemical Industry Co., Ltd. was used.

(Component (C))

<C-1: Mixture of Copper Iodide and Potassium Iodide>

A reagent manufactured by Wako Pure Chemical Industries, Ltd. was used as copper iodide. A reagent manufactured by Wako Pure Chemical Industries, Ltd. was used as potassium iodide. 1 part by mass of the copper iodide and 10 parts by mass of the potassium iodide were mixed and used.

<C-2: Hindered Phenol Compound>

IRGANOX 1098 manufactured by BASF Japan Ltd. was used.

<C-3: Hindered Amine Compound>

NYLOSTAB S-EED manufactured by Clariant (Japan) K.K. was used.

<C-4: Organic Phosphorus Compound>
IRGAFOS 168 manufactured by BASF Japan Ltd. was used.
((D) Inorganic Filler Except for Alkali Metal and/or Alkali Earth Metal Compound)
<Glass Fibers D-I>
The total mass was adjusted to 100% by mass by dilution with water such that, based on solid contents, a polyurethane resin was 2% by mass (trade name: Bondic(R) 1050, manufactured by DIC Corp.)), an ethylene-maleic anhydride copolymer (manufactured by Wako Pure Chemical Industries, Ltd.) was 8% by mass, γ-aminopropyltriethoxysilane was 0.6% by mass (trade name: KBE-903, (manufactured by Shin-Etsu Chemical Co., Ltd.)), and a lubricant was 0.1% by mass (trade name: Carnauba wax (manufactured by S. Kato & Co.)) to obtain a glass fiber sizing agent.

The glass fiber sizing agent was attached to melt-spun glass fibers having a number-average fiber diameter of 10 μm.

Specifically, the glass fiber sizing agent was applied to the glass fibers on their way to be taken up on a rotating drum using an applicator located at a predetermined position. Subsequently, this was dried to obtain a roving of a glass fiber bundle surface-treated with the glass fiber sizing agent (glass roving). The bundle involved 1,000 glass fibers.

The amount of the glass fiber sizing agent attached was 0.6% by mass. This roving was cut into a length of 3 mm to obtain a chopped glass strand. This chopped strand was used as <glass fibers D-I>.

Example 1

The extruder used was a twin-screw extruder (ZSK-26MC; manufactured by Coperion GmbH (Germany)).

This twin-screw extruder has an upstream feed port in the first barrel on the upstream side and has a downstream feed port in the 9th barrel. Its L/D (Length of the cylinder of the extruder/Diameter of the cylinder of the extruder) is 48 (the number of barrels: 12).

In this twin-screw extruder, the temperature from the upstream feed port to the die was set to the cylinder temperature described in each item of ((A) Polyamide resin) described above.

The number of screw revolutions was set to 300 rpm, and the discharge rate was set to 25 kg/hr.

Under these conditions, the component (A), the component (B), and the component (C) were supplied from the upstream feed port, while the component (D) was supplied from the downstream feed port so as to attain the ratios described in the upper boxes of Table 1 below. The mixture was melt-kneaded to produce pellets of a polyamide resin composition.

The obtained polyamide resin composition was molded, and the molded article was used to evaluate.

These evaluation results, etc., are shown in Table 1 below.

Examples 2 to 30 and Comparative Examples 1 to 4

According to the composition described in Tables 1 to 5, other conditions were set in the same way as in Example 1 to produce each polyamide resin composition. The obtained polyamide resin composition was molded. The molded article was used to carry out various measurements.

These measurement results, etc., are shown in Tables 1 to 5 below.

In the tables, the unit "% by mass" means "% by mass" with respect to 100% by mass of the polyamide composition.

TABLE 1

| | | | Comparative Example 1 | Comparative Example 2 | Comparative Example 3 | Example 1 | Example 2 | Example 3 | Example 4 | Example 5 |
|---|---|---|---|---|---|---|---|---|---|---|
| Composition | A-1 | [part by mass] | 100 | 100 | 100 | 100 | 100 | 100 | 100 | 100 |
| | B-1 | [part by mass] | — | — | 0.015 | 0.06 | 0.3 | 0.6 | 0.9 | 1.2 |
| | C-1 | [part by mass] | — | 0.03 | 0.03 | 0.03 | 0.03 | 0.03 | 0.03 | 0.03 |
| | D-1 | [% by mass] | 33 | 33 | 33 | 33 | 33 | 33 | 33 | 33 |
| Treatment condition | Treatment temperature | [° C.] | 230 | 230 | 230 | 230 | 230 | 230 | 230 | 230 |
| | Treatment time | [h] | 500 | 500 | 500 | 500 | 500 | 500 | 500 | 500 |
| Evaluation | Evaluation of concentration of alkali metal and/or alkaline earth metal within 3 μm deep from surface | | x | x | x | ○ | ○ | ○ | ○ | ○ |
| | Evaluation of lower carboxylate of alkali metal and/or alkaline earth metal within 1 μm deep from surface | | x | x | x | x | x | ○ | ○ | ○ |
| | Evaluation of carbonate of alkali metal and/or alkaline earth metal within 10 nm deep from surface | | x | x | x | x | x | x | ○ | ○ |
| | Solid-state NMR peak evaluation | | x | x | x | x | x | x | ○ | ○ |

TABLE 1-continued

|  |  |  |  |  |  |  |  |  |  |
|---|---|---|---|---|---|---|---|---|---|
|  | Weight-average molecular weight (Mw) |  | 6000 | 6000 | 8000 | 12000 | 20000 | 25000 | 55000 | 60000 |
|  | Mn/Mw |  | 4.0 | 4.0 | 3.8 | 4.1 | 4.1 | 4.2 | 4.3 | 4.5 |
|  | AMOUNT OF PORTION DISSOLVED IN HFIP (EXCEPT FOR INORGANIC MATTER) | [%] | 95 | 95 | 95 | 90 | 85 | 50 | 20 | 18 |
| Effect | Tensile strength after aforementioned treatment | [MPa] | 0 | 0 | 0 | 50 | 140 | 200 | 200 | 200 |
|  | Flexural modulus after aforementioned treatment | [Gpa] | 0 | 0 | 0 | 6.1 | 9.5 | 10 | 10 | 10 |
|  | Tensile strength at 180° C. after aforementioned treatment | [MPa] | 0 | 0 | 0 | 30 | 50 | 70 | 80 | 88 |
|  | Flexural modulus at 180° C. after aforementioned treatment | [Gpa] | 0 | 0 | 0 | 1.5 | 3.1 | 4.2 | 4.7 | 4.8 |
|  | Tensile strength at 200° C. after aforementioned treatment | [MPa] | 0 | 0 | 0 | 15 | 35 | 45 | 65 | 75 |
|  | Flexural modulus at 200° C. after aforementioned treatment | [Gpa] | 0 | 0 | 0 | 1.1 | 2.5 | 3.5 | 3.7 | 3.9 |

|  |  |  |  | Example 6 | Example 7 | Example 8 | Example 9 | Comparative Example 4 |
|---|---|---|---|---|---|---|---|---|
| Composition | A-1 |  | [part by mass] | 100 | 100 | 100 | 100 | 100 |
|  | B-1 |  | [part by mass] | 1.5 | 3 | 6 | 10 | 50 |
|  | C-1 |  | [part by mass] | 0.03 | 0.03 | 0.03 | 0.03 | 0.03 |
|  | D-1 |  | [% by mass] | 33 | 33 | 33 | 33 | 33 |
| Treatment condition | Treatment temperature |  | [° C.] | 230 | 230 | 230 | 230 | Molded article was unable to be prepared |
|  | Treatment time |  | [h] | 500 | 500 | 500 | 500 | Molded article was unable to be prepared |
| Evaluation | Evaluation of concentration of alkali metal and/or alkaline earth metal within 3 μm deep from surface |  |  | ○ | ○ | ○ | ○ | Molded article was unable to be prepared |
|  | Evaluation of lower carboxylate of alkali metal and/or alkaline earth metal within 1 μm deep from surface |  |  | ○ | ○ | ○ | ○ | Molded article was unable to be prepared |
|  | Evaluation of carbonate of alkali metal and/or alkaline earth metal within 10 nm deep from surface |  |  | ○ | ○ | ○ | ○ | Molded article was unable to be prepared |
|  | Solid-state NMR peak evaluation |  |  | ○ | ○ | ○ | ○ | Molded article was unable to be prepared |
|  | Weight-average molecular weight (Mw) |  |  | 60000 | 60000 | 60000 | 60000 | Molded article was unable to be prepared |
|  | Mn/Mw |  |  | 4.5 | 4.5 | 4.5 | 4.5 | Molded article was unable to be prepared |
|  | AMOUNT OF PORTION DISSOLVED IN HFIP (EXCEPT FOR INORGANIC MATTER) |  | [%] | 17 | 17 | 17 | 17 | Molded article was unable to be prepared |

TABLE 1-continued

|  |  | Effect | Tensile strength after aforementioned treatment | [MPa] | 195 | 180 | 175 | 170 | Molded article was unable to be prepared |
|---|---|---|---|---|---|---|---|---|---|
|  |  |  | Flexural modulus after aforementioned treatment | [Gpa] | 10 | 9.5 | 9.1 | 8.5 | Molded article was unable to be prepared |
|  |  |  | Tensile strength at 180° C. after aforementioned treatment | [MPa] | 88 | 86 | 80 | 73 | Molded article was unable to be prepared |
|  |  |  | Flexural modulus at 180° C. after aforementioned treatment | [Gpa] | 4.8 | 4.8 | 4.6 | 4.4 | Molded article was unable to be prepared |
|  |  |  | Tensile strength at 200° C. after aforementioned treatment | [MPa] | 75 | 74 | 72 | 65 | Molded article was unable to be prepared |
|  |  |  | Flexural modulus at 200° C. after aforementioned treatment | [Gpa] | 3.9 | 3.9 | 3.4 | 3 | Molded article was unable to be prepared |

TABLE 2

|  |  |  | Example 10 | Example 11 | Example 12 | Example 13 | Example 14 | Example 15 |
|---|---|---|---|---|---|---|---|---|
| Composition | A-1 | [part by mass] | 100 | — | — | — | — | — |
|  | A-2 | [part by mass] | — | 100 | — | — | — | — |
|  | A-3 | [part by mass] | — | — | 100 | — | — | — |
|  | A-4 | [part by mass] | — | — | — | 100 | — | — |
|  | A-5 | [part by mass] | — | — | — | — | 100 | — |
|  | A-6 | [part by mass] | — | — | — | — | — | 100 |
|  | B-1 | [part by mass] | 1 | 1 | 1 | 1 | 1 | 1 |
|  | D-1 | [% by mass] | 33 | 33 | 33 | 33 | 33 | 33 |
| Treatment condition | Treatment temperature | [° C.] | 230 | 230 | 230 | 230 | 230 | 230 |
|  | Treatment time | [h] | 500 | 500 | 500 | 500 | 500 | 500 |
| Evaluation | Evaluation of concentration of alkali metal and/or alkaline earth metal within 3 μm deep from surface |  | ○ | ○ | ○ | ○ | ○ | ○ |
|  | Evaluation of lower carboxylate of alkali metal and/or alkaline earth metal within 1 μm deep from surface |  | ○ | ○ | ○ | ○ | ○ | ○ |
|  | Evaluation of carbonate of alkali metal and/or alkaline earth metal within 10 nm deep from surface |  | ○ | ○ | ○ | ○ | ○ | ○ |
|  | Solid-state NMR peak evaluation |  | ○ | ○ | ○ | ○ | ○ | ○ |
|  | Weight-average molecular weight (Mw) |  | 56000 | 56000 | 56000 | — | — | — |
|  | Mn/Mw |  | 4.3 | 4.3 | 4.3 | — | — | — |
|  | AMOUNT OF PORTION DISSOLVED IN HFIP (EXCEPT FOR INORGANIC MATTER) | [%] | 20 | 20 | 20 | 20 | 20 | 20 |
| Effect | Tensile strength after aforementioned treatment | [MPa] | 200 | 200 | 200 | 200 | 200 | 200 |

TABLE 2-continued

|  |  |  | Example 10 | Example 11 | Example 12 | Example 13 | Example 14 | Example 15 |
|---|---|---|---|---|---|---|---|---|
|  | Flexural modulus after aforementioned treatment | [Gpa] | 10 | 10 | 10 | 10 | 10 | 10 |
|  | Tensile strength at 180° C. after aforementioned treatment | [MPa] | 88 | 88 | 88 | 88 | 88 | 88 |
|  | Flexural modulus at 180° C. after aforementioned treatment | [Gpa] | 4.8 | 4.8 | 4.8 | 4.8 | 4.8 | 4.8 |
|  | Tensile strength at 200° C. after aforementioned treatment | [MPa] | 75 | 75 | 75 | 75 | 75 | 75 |
|  | Flexural modulus at 200° C. after aforementioned treatment | [Gpa] | 3.9 | 3.9 | 3.9 | 3.9 | 3.9 | 3.9 |

TABLE 3

|  |  |  | Example 16 | Example 17 | Example 18 | Example 19 | Example 20 |
|---|---|---|---|---|---|---|---|
| Composition | A-1 | [part by mass] | 100 | 100 | 100 | 80 | 80 |
|  | A-7 | [part by mass] | — | — | — | 20 | — |
|  | A-8 | [part by mass] | — | — | — | — | 20 |
|  | B-1 | [part by mass] | 1 | 1 | 1 | 1 | 1 |
|  | C-2 | [part by mass] | 1 | — | — | — | — |
|  | C-3 | [part by mass] | — | 1 | — | — | — |
|  | C-4 | [part by mass] | — | — | 1 | — | — |
|  | D-1 | [% by mass] | 33 | 33 | 33 | 33 | 33 |
| Treatment condition | Treatment temperature | [° C.] | 230 | 230 | 230 | 230 | 230 |
|  | Treatment time | [h] | 500 | 500 | 500 | 500 | 500 |
| Evaluation | Evaluation of concentration of alkali metal and/or alkaline earth metal within 3 μm deep from surface |  | ○ | ○ | ○ | ○ | ○ |
|  | Evaluation of lower carboxylate of alkali metal and/or alkaline earth metal within 1 μm deep from surface |  | ○ | ○ | ○ | ○ | ○ |
|  | Evaluation of carbonate of alkali metal and/or alkaline earth metal within 10 nm deep from surface |  | ○ | ○ | ○ | ○ | ○ |
|  | Solid-state NMR peak evaluation |  | ○ | ○ | ○ | ○ | ○ |
|  | Weight-average molecular weight (Mw) |  | 56000 | 56000 | 56000 | 56000 | 56000 |
|  | Mn/Mw |  | 4.3 | 4.3 | 4.3 | 4.3 | 4.3 |
|  | AMOUNT OF PORTION DISSOLVED IN HFIP (EXCEPT FOR INORGANIC MATTER) | [%] | 20 | 20 | 20 | 20 | 20 |
| Effect | Tensile strength after aforementioned treatment | [MPa] | 190 | 190 | 190 | 190 | 190 |

TABLE 3-continued

|  |  |  | Example 16 | Example 17 | Example 18 | Example 19 | Example 20 |
|---|---|---|---|---|---|---|---|
|  | Flexural modulus after aforementioned treatment | [Gpa] | 9 | 9 | 9 | 9 | 9 |
|  | Tensile strength at 180° C. after aforementioned treatment | [MPa] | 86 | 86 | 86 | 88 | 88 |
|  | Flexural modulus at 180° C. after aforementioned treatment | [Gpa] | 4.4 | 4.4 | 4.4 | 4.5 | 4.5 |
|  | Tensile strength at 200° C. after aforementioned treatment | [MPa] | 72 | 72 | 72 | 73 | 73 |
|  | Flexural modulus at 200° C. after aforementioned treatment | [Gpa] | 3.7 | 3.7 | 3.7 | 3.7 | 3.7 |

TABLE 4

|  |  |  | Example 21 | Example 22 | Example 23 | Example 24 | Example 25 | Example 26 |
|---|---|---|---|---|---|---|---|---|
| Composition | A-1 | [part by mass] | 100 | 100 | 100 | 100 | 100 | 100 |
|  | B-2 | [part by mass] | 1.024 | — | — | — | — | — |
|  | B-3 | [part by mass] | — | 0.650 | — | — | — | — |
|  | B-4 | [part by mass] | — | — | 0.840 | — | — | — |
|  | B-5 | [part by mass] | — | — | — | 0.487 | — | — |
|  | B-6 | [part by mass] | — | — | — | — | — | — |
|  | B-7 | [part by mass] | — | — | — | — | — | — |
|  | D-1 | [% by mass] | 33 | 33 | 33 | 33 | 33 | 33 |
| Treatment condition | Treatment temperature | [° C.] | 230 | 230 | 230 | 230 | 230 | 230 |
|  | Treatment time | [h] | 500 | 500 | 500 | 500 | 500 | 500 |
| Evaluation | Evaluation of concentration of alkali metal and/or alkaline earth metal within 3 μm deep from surface |  | ○ | ○ | ○ | ○ | ○ | ○ |
|  | Evaluation of lower carboxylate of alkali metal and/or alkaline earth metal within 1 μm deep from surface |  | ○ | ○ | ○ | ○ | ○ | ○ |
|  | Evaluation of carbonate of alkali metal and/or alkaline earth metal within 10 nm deep from surface |  | ○ | ○ | ○ | ○ | ○ | ○ |
|  | Solid-state NMR peak evaluation |  | x | x | x | x | x | x |
|  | Weight-average molecular weight (Mw) |  | 56000 | 56000 | 56000 | 30000 | 30000 | 30000 |
|  | Mn/Mw |  | 4.3 | 4.3 | 4.3 | 3.8 | 4.1 | 4.2 |
|  | AMOUNT OF PORTION DISSOLVED IN HFIP (EXCEPT FOR INORGANIC MATTER) | [%] | 20 | 20 | 20 | 20 | 20 | 20 |
| Effect | Tensile strength after aforementioned treatment | [MPa] | 200 | 200 | 200 | 180 | 205 | 204 |

TABLE 4-continued

|  |  |  | Example 21 | Example 22 | Example 23 | Example 24 | Example 25 | Example 26 |
|---|---|---|---|---|---|---|---|---|
|  | Flexural modulus after aforementioned treatment | [Gpa] | 10 | 10 | 10 | 9 | 11 | 11 |
|  | Tensile strength at 180° C. after aforementioned treatment | [MPa] | 86 | 88 | 85 | 81 | 83 | 83 |
|  | Flexural modulus at 180° C. after aforementioned treatment | [Gpa] | 4.6 | 4.6 | 4.6 | 4.4 | 4.5 | 4.5 |
|  | Tensile strength at 200° C. after aforementioned treatment | [MPa] | 74 | 75 | 73 | 70 | 72 | 72 |
|  | Flexural modulus at 200° C. after aforementioned treatment | [Gpa] | 3.9 | 3.9 | 3.9 | 3.9 | 3.9 | 3.9 |

TABLE 5

|  |  |  | Example 27 | Example 28 | Example 29 | Example 30 |
|---|---|---|---|---|---|---|
| Composition | A-1 | [part by mass] | 100 | 100 | 100 | 100 |
|  | B-1 | [part by mass] | 1 | 1 | 1 | 1 |
|  | D-1 | [% by mass] | 33 | 33 | 33 | 33 |
| Treatment condition | Treatment temperature | [° C.] | 230 | 230 | 230 | 230 |
|  | Treatment time | [h] | 300 | 500 | 1000 | 2000 |
| Evaluation | Evaluation of concentration of alkali metal and/or alkaline earth metal within 3 μm deep from surface |  | ○ | ○ | ○ | ○ |
|  | Evaluation of lower carboxylate of alkali metal and/or alkaline earth metal within 1 μ deep from surface |  | ○ | ○ | ○ | ○ |
|  | Evaluation of carbonate of alkali metal and/or alkaline earth metal within 10 nm deep from surface |  | x | ○ | ○ | ○ |
|  | Solid-state NMR peak evaluation |  | x | ○ | ○ | ○ |
|  | Weight-average molecular weight (Mw) |  | 56000 | 56000 | 56000 | 58000 |
|  | Mn/Mw |  | 3.5 | 4.3 | 4.4 | 4.7 |
|  | AMOUNT OF PORTION DISSOLVED IN HFIP (EXCEPT FOR INORGANIC MATTER) | [%] | 26 | 20 | 17 | 17 |
| Effect | Tensile strength after aforementioned treatment | [MPa] | 200 | 200 | 190 | 180 |
|  | Flexural modulus after aforementioned treatment | [Gpa] | 10 | 10 | 9 | 8 |
|  | Tensile strength at 180° C. after aforementioned treatment | [MPa] | 80 | 88 | 88 | 88 |
|  | Flexural modulus at 180° C. after aforementioned | [Gpa] | 4.6 | 4.8 | 4.8 | 4.8 |

TABLE 5-continued

|  |  | Example 27 | Example 28 | Example 29 | Example 30 |
|---|---|---|---|---|---|
| treatment |  |  |  |  |  |
| Tensile strength at 200° C. after aforementioned treatment | [MPa] | 73 | 75 | 75 | 75 |
| Flexural modulus at 200° C. after aforementioned treatment | [Gpa] | 3.7 | 3.9 | 3.9 | 3.9 |

In Tables 1 to 5, "-" means that the measurement was not carried out.

Tables 1 to 5 demonstrated that the molded articles comprising the polyamide resin compositions of Examples 1 to 30 exhibit excellent mechanical characteristics even at high temperatures.

On the other hand, Comparative Examples 1 to 4 were inferior in high-temperature mechanical characteristics to Examples.

The molded article comprising the polyamide resin composition of the present invention has industrially applicable as various parts, for example, for automobiles, for machinery industry, for electric or electronic uses, for industrial materials, for engineering materials, and for daily necessities or domestic articles.

What is claimed is:

1. A molded article comprising a polyamide resin composition comprising a polyamide resin and at least one alkali metal and/or alkaline earth metal element mixed therein, wherein (the average concentration of alkali metal and/or alkaline earth metal elements in a region within a depth of 3 μm from the surface of the polyamide resin composition of the molded article)/(the average concentration of alkali metal and/or alkaline earth metal elements in a region of the polyamide resin composition of the molded article except for the region within a depth of 3 μm from the surface of the polyamide resin composition of the molded article)>2.

2. The molded article according to claim 1, wherein the molded article comprises a lower carboxylate of an alkali metal and/or an alkaline earth metal in a region within a depth of 1 μm from the surface of the polyamide resin composition of the molded article.

3. The molded article according to claim 1, wherein the molded article comprises a carbonate of an alkali metal and/or an alkaline earth metal in a region within a depth of 10 nm from the surface of the polyamide resin composition of the molded article.

4. The molded article according to claim 1, wherein the molded article
comprises a metal aluminate, and
has one or more peaks each in ranges of 0 to 30 ppm, 30 to 60 ppm, and 70 to 100 ppm in solid-state 27Al-NMR measurement.

5. The molded article according to claim 1, wherein the molded article has Mw of 50000 or higher and Mw/Mn of 3 or higher.

6. The molded article according to claim 1, wherein the soluble content in hexafluoroisopropanol (HFIP) of a polyamide resin portion contained in the polyamide resin composition is 50% by mass or less of the polyamide resin portion contained in the polyamide resin composition.

7. A molded article comprising a polyamide resin composition comprising a polyamide resin and at least one alkali metal and/or alkaline earth metal element mixed therein, wherein the molded article satisfies the following expression:

$\alpha/\beta > 2$, wherein

α represents the average concentration of alkali metal and/or alkaline earth metal elements in a region within a depth of 3 μm from the surface of the polyamide resin composition of the molded article after heat aging treatment at 230° C. for 300 hours or longer, and β represents the average concentration of alkali metal and/or alkaline earth metal elements in a region of the polyamide resin composition of the molded article except for the region within a depth of 3 μm from the surface of the polyamide resin composition of the molded article after heat aging treatment at 230° C. for 300 hours or longer.

8. The molded article according to claim 7, wherein the molded article comprises a lower carboxylate of an alkali metal and/or an alkaline earth metal in a region within a depth of 1 μm from the surface of the polyamide resin composition of the molded article after heat aging treatment at 230° C. for 300 hours or longer.

9. The molded article according to claim 7, wherein the molded article contains a carbonate of an alkali metal and/or an alkaline earth metal in a region within a depth of 10 nm from the surface of the polyamide resin composition of the molded article after heat aging treatment at 230° C. for 300 hours or longer.

10. The molded article according to claim 7, wherein the molded article
comprises a metal aluminate, and
has one or more peaks each in ranges of 0 to 30 ppm, 30 to 60 ppm, and 70 to 100 ppm in solid-state 27Al-NMR measurement
after heat aging treatment at 230° C. for 300 hours or longer.

11. The molded article according to claim 7, wherein the molded article has Mw of 50000 or higher and Mw/Mn of 3 or higher
after heat aging treatment at 230° C. for 300 hours or longer.

12. The molded article according to claim 7, wherein the soluble content in hexafluoroisopropanol (HFIP) of a polyamide resin portion contained in the polyamide resin composition is 50% by mass or less of the polyamide resin portion contained in the polyamide resin composition after heat aging treatment at 230° C. for 300 hours or longer.

13. The molded article according to claim 1, wherein the molded article is an automobile part.

14. The molded article according to claim 1, wherein the molded article is an automobile underhood part.

15. The molded article according to claim 1, wherein the molded article is a hollow part.

16. The molded article according to claim 7, wherein the molded article is an automobile part.

17. The molded article according to claim 7, wherein the molded article is an automobile underhood part.

18. The molded article according to claim 7, wherein the molded article is a hollow part.

\* \* \* \* \*